(12) United States Patent
Anderson

(10) Patent No.: US 7,437,013 B2
(45) Date of Patent: Oct. 14, 2008

(54) DIRECTIONAL SPATIAL VIDEO NOISE REDUCTION

(75) Inventor: Candace M. Anderson, Rancho Santa Fe, CA (US)

(73) Assignee: General Instrument Corporation, Horsham, PA (US)

(*) Notice: Subject to any disclaimer, the term of this patent is extended or adjusted under 35 U.S.C. 154(b) by 558 days.

(21) Appl. No.: 10/809,022

(22) Filed: Mar. 24, 2004

(65) Prior Publication Data

US 2005/0135700 A1 Jun. 23, 2005

Related U.S. Application Data

(63) Continuation-in-part of application No. 10/744,721, filed on Dec. 23, 2003.

(51) Int. Cl.
*G06K 9/40* (2006.01)

(52) U.S. Cl. ............... 382/261; 382/260; 382/274; 382/275; 358/3.26; 358/3.27; 358/463

(58) Field of Classification Search ............ 382/260, 382/261, 263, 264, 275, 274, 305; 358/3.26, 358/3.27, 463
See application file for complete search history.

(56) References Cited

U.S. PATENT DOCUMENTS

| | | | | |
|---|---|---|---|---|
| 4,027,054 A | * | 5/1977 | Porod | ............ 427/79 |
| 5,032,903 A | | 7/1991 | Suzuki et al. | |
| 5,159,455 A | * | 10/1992 | Cox et al. | ............ 348/218.1 |
| 5,434,902 A | * | 7/1995 | Bruijns | ............ 378/98.7 |
| 5,469,226 A | * | 11/1995 | David et al. | ............ 348/699 |
| 5,537,157 A | * | 7/1996 | Washino et al. | ............ 348/722 |
| 5,537,159 A | * | 7/1996 | Suematsu et al. | ............ 348/745 |
| 5,600,380 A | * | 2/1997 | Patel et al. | ............ 348/614 |
| 5,727,423 A | * | 3/1998 | Torii et al. | ............ 74/335 |
| 5,844,627 A | | 12/1998 | May et al. | |
| 5,867,606 A | | 2/1999 | Tretter | |
| 5,930,411 A | * | 7/1999 | Kojima et al. | ............ 382/312 |
| 5,974,193 A | | 10/1999 | Baudouin | |
| 6,061,100 A | | 5/2000 | Ward et al. | |
| 6,069,984 A | * | 5/2000 | Sadler et al. | ............ 382/321 |
| 6,108,455 A | * | 8/2000 | Mancuso | ............ 382/261 |
| 6,122,016 A | * | 9/2000 | De Haan et al. | ............ 348/620 |
| 6,141,446 A | * | 10/2000 | Boliek et al. | ............ 382/233 |
| 6,229,520 B1 | | 5/2001 | Clatanoff et al. | |

(Continued)

OTHER PUBLICATIONS

Jostschulte, K., et al., "Perception Adaptive Temporal TV-Noise Reduction Using Contour Preserving Prefilter Techniques," IEEE Transactions on Consumer Electronics, vol. 44, No. 3, 1998, pp. 1091-1096.

(Continued)

*Primary Examiner*—Yosef Kassa
(74) *Attorney, Agent, or Firm*—Benjamin D. Driscoll

(57) ABSTRACT

A method of reducing spatial noise in an image. Low-pass (smoothing) filters are calculated simultaneously from three successive image rows. Three blocks (m1, m2, m3) are associated with the three successive image rows, and the blocks are processed in row-major order. This implementation is applicable to both luminance and chrominance. The number of smoothing parameters is reduced to one. The technique is applicable to both luminance and chrominance. Directional mapping is used. Extension of the technique to spatial filtering using a 5×5 neighborhood (using five successive image rows) is described. Embodiments of the method using the MMX instruction set are described.

20 Claims, 21 Drawing Sheets

U.S. PATENT DOCUMENTS

| | | | |
|---|---|---|---|
| 6,229,578 | B1 | 5/2001 | Acharya et al. |
| 6,285,798 | B1 | 9/2001 | Lee |
| 6,295,382 | B1 | 9/2001 | Karanovic |
| 6,322,505 | B1* | 11/2001 | Hossack et al. ............. 600/437 |
| 6,335,990 | B1 | 1/2002 | Chen et al. |
| 6,411,305 | B1 | 6/2002 | Chui |
| 6,614,944 | B1 | 9/2003 | Levantovsky |
| 6,671,340 | B1 | 12/2003 | Kroeger et al. |
| 6,697,660 | B1* | 2/2004 | Robinson ................... 600/409 |
| 6,842,538 | B2* | 1/2005 | Lee et al. ................... 382/224 |
| 6,990,247 | B2* | 1/2006 | Schwartz ................... 382/240 |
| 6,993,191 | B2 | 1/2006 | Petrescu |
| 7,024,046 | B2* | 4/2006 | Dekel et al. ................ 382/240 |
| 7,054,493 | B2* | 5/2006 | Schwartz ................... 382/232 |
| 7,110,602 | B2 | 9/2006 | Krause |
| 7,167,602 | B2 | 1/2007 | Yamashita et al. |

OTHER PUBLICATIONS

Lee, J.S., "Digital Image Enhancement and Noise Filtering by Use of Local Statistics," IEEE Transactions on Pattern Analysis and Machine Intelligence, vol. PAMI-2, No. 2, Mar. 1980, pp. 165-168.

Lee, J.S., "Refined Filtering of Image Noise Using Local Statistics," Computer Graphics & Image Processing, vol. 15, No. 4, Apr. 1981, pp. 380-389.

Kuan, D.T., et al., "Adaptive Noise Smoothing Filter for Images with Signal-Dependent Noise," IEEE Transactions on Pattern Analysis and Machine Intelligence, vol. PAMI-7, No. 2, Mar. 1985, pp. 165-177.

* cited by examiner

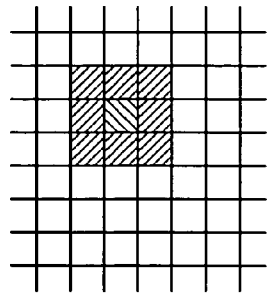
-PRIOR ART-
*FIG. 1A*
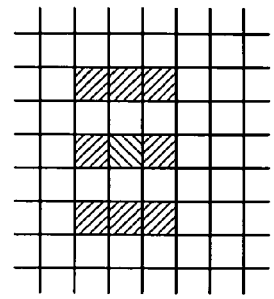
-PRIOR ART-
*FIG. 1B*
-PRIOR ART-
*FIG. 2*
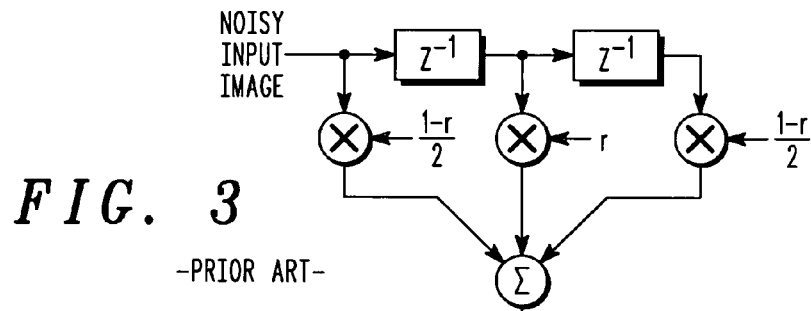
*FIG. 3*
-PRIOR ART-
*FIG. 4*
-PRIOR ART-
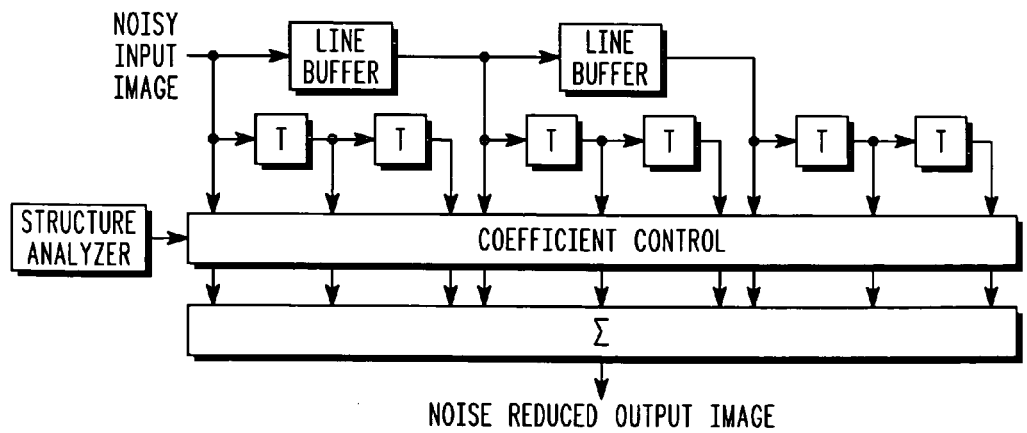

-PRIOR ART-

| k=0 DIAGONAL, LEFT | | |
|---|---|---|
| | | -1/4 |
| | 1/2 | |
| -1/4 | | |

| k=1 VERTICAL | | |
|---|---|---|
| | -1/4 | |
| | 1/2 | |
| | -1/4 | |

| k=2 DIAGONAL, RIGHT | | |
|---|---|---|
| -1/4 | | |
| | 1/2 | |
| | | -1/4 |

| k=3 HORIZONTAL | | |
|---|---|---|
| | | |
| -1/4 | 1/2 | -1/4 |
| | | |

| k=4 CORNER, UP-RIGHT | | |
|---|---|---|
| | -1/4 | |
| | 1/2 | -1/4 |
| | | |

| k=5 CORNER, UP-LEFT | | |
|---|---|---|
| | -1/4 | |
| -1/4 | 1/2 | |
| | | |

| k=6 CORNER, LOW-LEFT | | |
|---|---|---|
| | | |
| -1/4 | 1/2 | |
| | -1/4 | |

| k=7 CORNER, LOW-RIGHT | | |
|---|---|---|
| | | |
| | 1/2 | -1/4 |
| | -1/4 | |

| | k=[0,3] | k=[0,7] | |
|---|---|---|---|
| MINIMUM DIRECTION | %(4HP) | %(8HP) | MIMIMUM DIRECTION |
| DIAGONAL LEFT (k=0) | 48 | 20 | 21 | CORNER_UR (k=4) |
| VERTICAL (k=1) | 65 | 26 | 18 | CORNER_UL (k=5) |
| DIAGONAL RIGHT (k=2) | 12 | 14 | 21 | CORNER_LL (k=6) |
| HORIZONTAL (K=3) | 14 | 21 | 19 | CORNER_LR (k=7) |
| TOTAL (4HP) | 139 | | 160 | TOTAL (8HP) |

| D | COEFFICIENT VALUES FOR NUMBER OF EQUAL DIRECTIONS | | | | | | | | | | | N |
|---|---|---|---|---|---|---|---|---|---|---|---|---|
| 1 | 1/2 | 1/4 | | 3/20 | | 1/10 | | | | | | 8 |
| 2 | 1/2 | 1/4 | | | 1/8 | | | | | | | 28 |
| 3 | 1/2 | 1/4 | | 1/6 | | | | 1/12 | | | | 56 |
| 4 | 1/2 | | 3/16 | | 1/8 | | | | 1/16 | | | 70 |
| 5 | 1/2 | | | 3/20 | | 1/10 | | | | 1/20 | | 56 |
| 6 | 1/2 | | | | 1/8 | | | 1/12 | | | 1/24 | 28 |
| 7 | 1/2 | | | | | 3/28 | | | 1/14 | | | 1/28 | 8 |
| 8 | 1/2 | | | | | | 3/32 | | | | | 1/32 | 1 |

FIG. 10

|   | D=1 |   |
|---|---|---|
| 0 | -1 | 0 |
| 0 | 2 | 0 |
| 0 | -1 | 0 |

|   | D=2 |   |
|---|---|---|
| 0 | -1 | 0 |
| -1 | -4 | -1 |
| 0 | -1 | 0 |

|   | D=3 |   |
|---|---|---|
| -1 | -1 | 0 |
| -1 | 6 | -1 |
| 0 | -1 | -1 |

|   | D=4 |   |
|---|---|---|
| -1 | -1 | -1 |
| -1 | 8 | -1 |
| -1 | -1 | -1 |

| 0 | 60 | 0 |
|---|---|---|
| 0 | 138 | 0 |
| 0 | 60 | 0 |

| 0 | 30 | 0 |
|---|---|---|
| 0 | 136 | 0 |
| 0 | 30 | 0 |

| 20 | 20 | 0 |
|---|---|---|
| 20 | 136 | 20 |
| 0 | 20 | 20 |

| 15 | 15 | 15 |
|---|---|---|
| 15 | 136 | 15 |
| 15 | 15 | 15 |

*FIG. 13*

VERTICAL

|   | -1/4 |   |
|---|---|---|
|   | 1/2 |   |
|   | -1/4 |   |

DIAGONAL LEFT

|   |   | -1/4 |
|---|---|---|
|   | 1/2 |   |
| -1/4 |   |   |

DIAGONAL RIGHT

| -1/4 |   |   |
|---|---|---|
|   | 1/2 |   |
|   |   | -1/4 |

HORIZONTAL

|   |   |   |
|---|---|---|
| -1/4 | 1/2 | -1/4 |
|   |   |   |

*FIG. 14*

M1 | H | G | F | E | D | C | B | A |  UP (ROW i-1)

M2 | Q | P | O | N | M | L | K | J |  MID (ROW i)

M3 | Z | Y | X | W | V | U | T | S |  DWN (ROW i+1)

*FIG. 15*

| H | G | F | E | D | C | B | A |   ↑ VERTICAL DIRECTION
|---|---|---|---|---|---|---|---|
| Z | Y | X | W | V | U | T | S |

| | | | | | | | | |
|---|---|---|---|---|---|---|---|---|
| (H+Z)/2 | (G+Y)/2 | (F+X)/2 | (E+W)/2 | (D+V)/2 | (H+Z)/2 | (H+Z)/2 | (H+Z)/2 | AVERAGE |
| Q OR HZ | P OR GY | O OF FX | N OR EW | M OR DV | L OR CU | K OR BT | J OR AS | MAXIMUM |
| Q OR HZ | P OR GY | O OF FX | N OR EW | M OR DV | L OR CU | K OR BT | J OR AS | MINIMUM |
| VABS7 | VABS6 | VABS5 | VABS4 | VABS3 | VABS2 | VABS1 | VABS0 | MAX-MIN  ABS(HIGH PASS) |
| VSGN7 | VSGN6 | VSGN5 | VSGN4 | VSGN3 | VSGN2 | VSGN1 | VSGN0 | MID-MIN?  SGN(HIGH PASS) |

*FIG. 16*

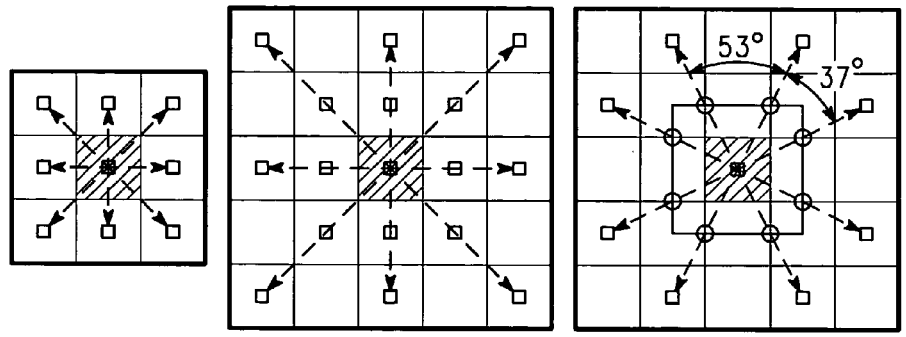
FIG. 21
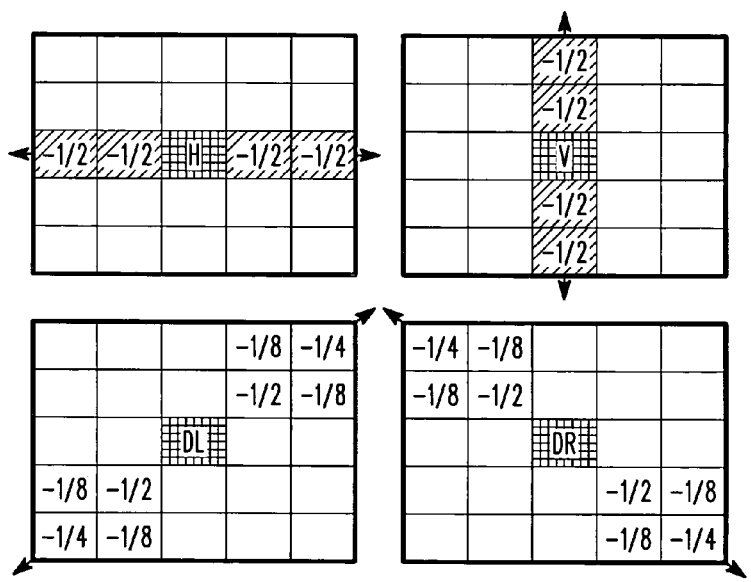
FIG. 22
FIG. 23

| INDEX | NAME | ANGEL (DEGREES) | Δx1, Δy1 | Δx2, Δy2 |
|---|---|---|---|---|
| 1 | HORIZONTAL (H) | 0, 180 | ±1, 0 | ±2, 0 |
| 2 | DIAGONAL LEFT (DL) | 45, -135 | ±1, ±1 | ±2, ±2 |
| 3 | VERTICAL (V) | ±90 | 0, ±1 | 0, ±2 |
| 4 | DIAGONAL RIGHT (DR) | 135, -45 | ∓1, ∓1 | ∓2, ∓2 |
| 5 | LESSER ANGLE LEFT (LL) | ~(+27), ~(-153) | ±1, ±1/2 | ±2, ±1 |
| 6 | LESSER ANGLE RIGHT (LR) | ~(-27), ~(+153) | ∓1, ∓1/2 | ∓2, ∓1 |
| 7 | GREATER ANGLE LEFT (GL) | ~(+63), ~(-117) | ±1/2, ±1 | ±1, ±2 |
| 8 | GREATER ANGLE RIGHT (GR) | ~(+117), ~(-63) | ∓1/2, ∓1 | ∓1, ∓2 |
*FIG. 24*
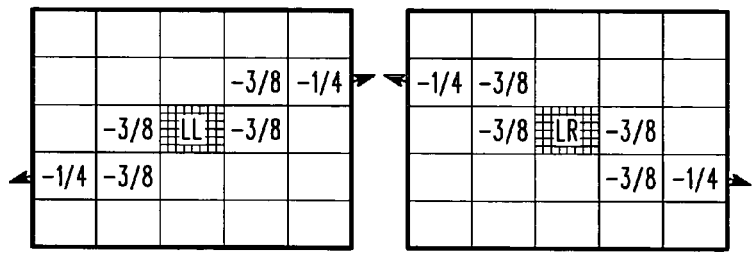
*FIG. 25*
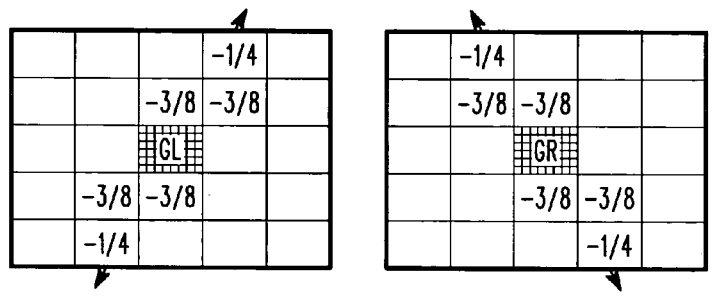
*FIG. 26*

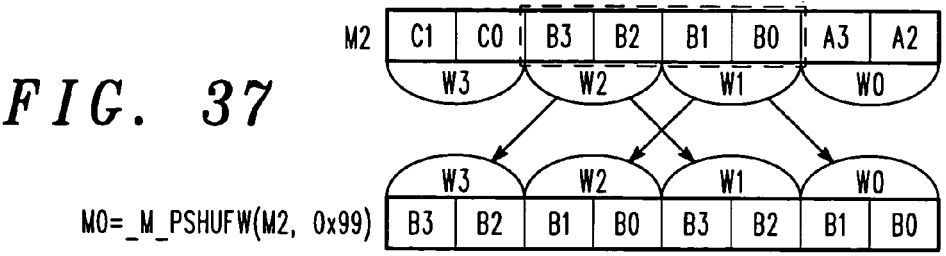

FIG. 37

M0=_M_PSHUFW(M2, 0x99)

| M6=_M_PMINUB(M0, M4) | NV3 | NV2 | NV1 | NV0 | NH3 | NH2 | NH1 | NH0 |
| --- | --- | --- | --- | --- | --- | --- | --- | --- |
| M4=_M_PMAXUB(M0, M4) | XV3 | XV2 | XV1 | XV0 | XH3 | XH2 | XH1 | XH0 |
| M4=_M_PSUBUSB(M4, M6) | |V3| | |V2| | |V1| | |V0| | |H3| | |H2| | |H1| | |H0| |
| | ABS VERTICAL HP | | | | ABS HORIZONTAL HP | | | |
| SGNVH=_M_PCMPEQB(M0, M6) | SV3 | SV2 | SV1 | SV0 | SH3 | SH2 | SH1 | SH0 |
| | VERTICAL HP SIGNS | | | | HORIZONTAL HP SIGNS | | | |

FIG. 38

| M7=_M_PMINUB(M0, M5) | NL3 | NL2 | NL1 | NL0 | NR3 | NR2 | NR1 | NR0 |
| --- | --- | --- | --- | --- | --- | --- | --- | --- |
| M5=_M_PMAXUB(M0, M5) | XL3 | XL2 | XL1 | XL0 | XR3 | XR2 | XR1 | XR0 |
| M5=_M_PSUBUSB(M5, M7) | |L3| | |L2| | |L1| | |L0| | |R3| | |R2| | |R1| | |R0| |
| | ABS LEFT DIAGONAL HP | | | | ABS RIGHT DIAGONAL HP | | | |
| SGNLR=_M_PCMPEQB(M0, M7) | SL3 | SL2 | SL1 | SL0 | SR3 | SR2 | SR1 | SR0 |
| | LEFT DIAGONAL HP SIGNS | | | | RIGHT DIAGONAL HP SIGNS | | | |

FIG. 39

| | | | | | | | | |
|---|---|---|---|---|---|---|---|---|
| M0=_M_PUNPCKLBW(M0, 0) | ZERO | B3 | ZERO | B2 | ZERO | B1 | ZERO | B0 |
| M0=_M_PSLLWI(M0, 2) | ZERO | 4B3 | ZERO | 4B2 | ZERO | 4B1 | ZERO | 4B0 |
| M3=_M_PUNPCKHBW(M4, M6) | SV3 | V3 | SV2 | V2 | SV1 | V1 | SV0 | V0 |
| M0=_M_PSUBUSW(M0, M3) | 4B3-V3 | | 4B3-V2 | | 4B3-V1 | | 4B3-V0 | |
| M3=_M_PUNPCKLBW(M4, M6) | SH3 | H3 | SH2 | H2 | SH1 | H1 | SH0 | H0 |
| M0=_M_PSUBSW(M0, M3) | 4B3-VH3 | | 4B3-VH2 | | 4B3-VH1 | | 4B3-VH0 | |
| M3=_M_PUNPCKHBW(M5, M7) | SL3 | L3 | SL2 | L2 | SL1 | L1 | SL0 | L0 |
| M0=_M_PSUBUSW(M0, M3) | 4B3-VHL3 | | 4B3-VHL2 | | 4B3-VHL1 | | 4B3-VHL0 | |
| M3=_M_PUNPCKLBW(M5, M3) | SR3 | R3 | SR2 | R2 | SR1 | R1 | SR0 | R0 |
| M0=_M_PSUBUSW(M0, M3) | 4B3-VHLR3 | | 4B3-VHLR2 | | 4B3-VHLR1 | | 4B3-VHLR0 | |

*FIG. 42*

| | | | | | | | | |
|---|---|---|---|---|---|---|---|---|
| M7=_M_PADDB(M6, M7) | SVL3 | SVL2 | SVL1 | SVL0 | SHR3 | SHR2 | SHR1 | SHR0 |
| M3=_M_PSLLQI(M7, 32) | SHR3 | SHR2 | SHR1 | SHR0 | ZERO | ZERO | ZERO | ZERO |
| M3=_M_PADDB(M3, M7) | STOT3 | STOT2 | STOT1 | STOT0 | SHR3 | SHR2 | SHR1 | SHR0 |
| FFX4 | 0xFF | 0xFF | 0xFF | 0xFF | 0x00 | 0x00 | 0x00 | 0x00 |
| M3=_M_PXOR(M3, FFX4) | STOT3 | STOT2 | STOT1 | STOT0 | SHR3 | SHR2 | SHR1 | SHR0 |

TOT HP SIGNS=1'S COMP

| | | | | | | | | |
|---|---|---|---|---|---|---|---|---|
| ONEX | 0x01 | 0x01 | 0x01 | 0x01 | 0x00 | 0x00 | 0x00 | 0x00 |
| M3=_M_PADDB(M3, ONEX4) | STOT3 | STOT2 | STOT1 | STOT0 | | | | |

TOT HP SIGNS 2'S COMP

| | | | | | | | | |
|---|---|---|---|---|---|---|---|---|
| M3=_M_PUNPCKHBW(M3, 0) | ZERO | STOT3 | ZERO | STOT2 | ZERO | STOT1 | ZERO | STOT0 |
| M0=_M_PSUBSW(M0, M3) | 4LPFB3 | | 4LPFB2 | | 4LPFB1 | | 4LPFB0 | |

*FIG. 43*

| | | | | |
|---|---|---|---|---|
| MDX4 | 0x0002 | 0x0002 | 0x0002 | 0x0002 |
| M0=_M_PADDW(M0, MDX4) | 4LPF3+2 | 4LPF2+2 | 4LPF1+2 | 4LPF0+2 |
| M0=_M_PSRLW(M0, 2) | ZERO \| LPF3 | ZERO \| LPF2 | ZERO \| LPF1 | ZERO \| LPF0 |
| M0=_M_PACKUSWB(M0, 0) | ZERO \| ZERO | ZERO \| ZERO | LPF3 \| LPF2 | LPF1 \| LPF0 |
| *(LUM+ij)=_M_TO_INT(M0) | | | B'3 \| B'2 | B'1 \| B'0 |

SMOOTHED BYTES

FIG. 44

| | | | | | | | | |
|---|---|---|---|---|---|---|---|---|
| M6=_M_PADDB(DIRVH, DIRLR) | DVL3 | DVL2 | DVL1 | DVL0 | DHR3 | DHR2 | DHR1 | DHR0 |
| M7=_M_PSRLQI(M6, 32) | ZERO | ZERO | ZERO | ZERO | DVL3 | DVL2 | DVL1 | DVL0 |
| M7=_M_PADDB(M6, M7) | ZERO | ZERO | ZERO | ZERO | DALL3 | DALL2 | DALL1 | DALL0 |
| *(DIRMAP+ij)=_M_TO_INT(M7) | | | | | DALL3 | DALL2 | DALL1 | DALL0 |

DIRECTION MAP

FIG. 45

| D=1 HIGH-PASS | | | | |
|---|---|---|---|---|
| 0 | 0 | -4 | 0 | 0 |
| 0 | 0 | -4 | 0 | 0 |
| 0 | 0 | 16 | 0 | 0 |
| 0 | 0 | -4 | 0 | 0 |
| 0 | 0 | -4 | 0 | 0 |

| LOW-PASS (87.5%) | | | | |
|---|---|---|---|---|
| 0 | 0 | 4 | 0 | 0 |
| 0 | 0 | 4 | 0 | 0 |
| 0 | 0 | 112 | 0 | 0 |
| 0 | 0 | 4 | 0 | 0 |
| 0 | 0 | 4 | 0 | 0 |

| D=2 HIGH-PASS | | | | |
|---|---|---|---|---|
| 0 | 0 | -4 | 0 | 0 |
| 0 | 0 | -4 | 0 | 0 |
| -4 | -4 | 32 | -4 | -4 |
| 0 | 0 | -4 | 0 | 0 |
| 0 | 0 | -4 | 0 | 0 |

| LOW-PASS (75%) | | | | |
|---|---|---|---|---|
| 0 | 0 | 4 | 0 | 0 |
| 0 | 0 | 4 | 0 | 0 |
| 4 | 4 | 96 | 4 | 4 |
| 0 | 0 | 4 | 0 | 0 |
| 0 | 0 | 4 | 0 | 0 |

| D=3 HIGH-PASS | | | | |
|---|---|---|---|---|
| 0 | 0 | -4 | -1 | -2 |
| 0 | 0 | -4 | -4 | -1 |
| -4 | -4 | 48 | -4 | -4 |
| -1 | -4 | -4 | 0 | 0 |
| -2 | -1 | -4 | 0 | 0 |

| LOW-PASS (62.5%) | | | | |
|---|---|---|---|---|
| 0 | 0 | 4 | 1 | 2 |
| 0 | 0 | 4 | 4 | 1 |
| 4 | 4 | 80 | 4 | 4 |
| 1 | 4 | 4 | 0 | 0 |
| 2 | 1 | 4 | 0 | 0 |

| D=4 HIGH-PASS | | | | |
|---|---|---|---|---|
| -2 | -1 | -4 | -1 | -2 |
| -1 | -4 | -4 | -4 | -1 |
| -4 | -4 | 64 | -4 | -4 |
| -1 | -4 | -4 | -4 | -1 |
| -2 | -1 | -4 | -1 | -2 |

| LOW-PASS (50%) | | | | |
|---|---|---|---|---|
| 2 | 1 | 4 | 1 | 2 |
| 1 | 4 | 4 | 4 | 1 |
| 4 | 4 | 64 | 4 | 4 |
| 1 | 4 | 4 | 4 | 1 |
| 2 | 1 | 4 | 1 | 2 |

| D=5 HIGH-PASS | | | | |
|---|---|---|---|---|
| -2 | -1 | -4 | -1 | -2 |
| -1 | -4 | -4 | -7 | -3 |
| -4 | -7 | 80 | -7 | -4 |
| -3 | -7 | -4 | -4 | -1 |
| -2 | -1 | -4 | -1 | -2 |

| LOW-PASS (37.5%) | | | | |
|---|---|---|---|---|
| 2 | 1 | 4 | 1 | 2 |
| 1 | 4 | 4 | 7 | 3 |
| 4 | 7 | 48 | 7 | 4 |
| 3 | 7 | 4 | 4 | 1 |
| 2 | 1 | 4 | 1 | 2 |

| D=6 HIGH-PASS | | | | |
|---|---|---|---|---|
| -2 | -1 | -4 | -1 | -2 |
| -3 | -7 | -4 | -7 | -3 |
| -4 | -10 | 96 | -10 | -4 |
| -3 | -7 | -4 | -7 | -3 |
| -2 | -1 | -4 | -1 | -2 |

| LOW-PASS (25%) | | | | |
|---|---|---|---|---|
| 2 | 1 | 4 | 1 | 2 |
| 3 | 7 | 4 | 7 | 3 |
| 4 | 10 | 32 | 10 | 4 |
| 3 | 7 | 4 | 7 | 3 |
| 2 | 1 | 4 | 1 | 2 |

| D=7 HIGH-PASS | | | | |
|---|---|---|---|---|
| -2 | -1 | -4 | -3 | -2 |
| -3 | -7 | -7 | -10 | -3 |
| -4 | -10 | 112 | -10 | -4 |
| -3 | -10 | -7 | -7 | -3 |
| -2 | -3 | -4 | -1 | -2 |

| LOW-PASS (12.5%) | | | | |
|---|---|---|---|---|
| 2 | 1 | 4 | 3 | 2 |
| 3 | 7 | 7 | 10 | 3 |
| 4 | 10 | 16 | 10 | 4 |
| 3 | 10 | 7 | 7 | 3 |
| 2 | 3 | 4 | 1 | 2 |

| D=8 HIGH-PASS | | | | |
|---|---|---|---|---|
| -2 | -3 | -4 | -3 | -2 |
| -3 | -10 | -10 | -10 | -3 |
| -4 | -10 | 128 | -10 | -4 |
| -3 | -10 | -7 | -10 | -6 |
| -2 | -3 | -4 | -3 | -2 |

| LOW-PASS (0%) | | | | |
|---|---|---|---|---|
| 2 | 3 | 4 | 3 | 2 |
| 3 | 10 | 10 | 10 | 3 |
| 4 | 10 | 0 | 10 | 4 |
| 3 | 10 | 7 | 10 | 6 |
| 2 | 3 | 4 | 3 | 2 |

*FIG. 46*

DIRECTIONAL SPATIAL VIDEO NOISE REDUCTION

CROSS-REFERENCE TO RELATED APPLICATIONS

This is a continuation-in-part of commonly assigned U.S. patent application Ser. No. 10/744,721, filed on Dec. 23, 2003 and incorporated herein by reference.

FIELD OF THE INVENTION

The present invention relates to video signal processing and, more particularly, to digital filtering techniques for noise elimination.

BACKGROUND

A sequence of still images creates the illusion of motion. In film (motion pictures), there are normally 24 frames per second. To create the illusion of motion, the image in each frame varies slightly from the image in the preceding frame. (At scene cuts, there are large, abrupt changes in the image.) In video, there are typically 30 frames per second. A video image comprises hundreds of scan lines. In interleaved video, each frame comprises two fields. Each field image contains half of the scan lines (odd or even), and can be thought of as being a half-resolution frame image.

The present invention relates to video (digital) images. Each digital image comprises a plurality (typically hundreds or thousands) of pixels. Each pixel contains information (values) about the chrominance and luminance of a small portion of the image. The present invention relates to a technique for analyzing the individual pixels of a digital image to determine whether the pixel has "noise", then correcting the pixel values to reduce the noise level of the pixel. This is done by "filtering" the pixels of the images.

Correcting or reducing the noise level of image pixels is important for at least two reasons. First, the resulting image can (should) look better (fewer defects). Second, modern digital compression techniques function by detecting changes in images, such as motion, and can benefit from images that have less noise. The overall goal of effective filtering is to reduce abrupt changes, without sacrificing picture quality (sharpness).

A problem which is pervasive to noise filtering is that certain features of images, such as object edges, can look a lot like noise when filtering is performed on a pixel-by-pixel basis. An effective noise-filtering algorithm is one which can reduce noise without sacrificing picture quality. Generally speaking, there are two types of image filtering, "spatial" and "temporal".

In spatial filtering, the value of a given pixel is compared to the values of the pixels surrounding (in the vicinity of, in the neighborhood of) the given pixel, in a given image. The given pixel may, for example, be a center pixel of a 3×3 array of pixels. If, for example, the center pixel in the array had a value of 1000*X, and the surrounding pixels all had a value of 2*X, it could be assumed that the value of the center pixel is erroneous, and it could be altered, using a number of techniques, to bring it into line with the values of the surrounding pixels. In temporal filtering, the values of a given pixel at a specific location within an image is compared with the values for a pixel at the same location in a previous or subsequent image. If the value of a pixel at a certain location within a given image varies dramatically from the value of pixels at the same location within a previous and/or subsequent image, its value can be modified to bring it more into line with what would be expected. Combinations of spatial and temporal filtering are also known.

Noise reduction of a video signal is used to enhance the quality of images comprising the video signal and to prepare for an efficient compression of the video signal. Noise reduction is important in connection with compression of image information, because noise may significantly reduce the effectiveness of compression schemes, particularly frequency-domain compression schemes such as the various MPEG video standards. In image compression technology there is typically a trade-off between compression and image quality; increased compression may tend to reduce image quality. It is not always easy to reconcile these differences so as to achieve high quality highly compressed images. Effective noise reduction in connection with compression of a video signal may well serve both purposes and produce enhanced images in addition to a well-compressed video signal.

Video compression lowers the necessary bandwidth for transmitting moving pictures by removing picture redundancy. This is done in both spatial and temporal domains. The process begins with a conversion from spatial to frequency domain via a Discrete Cosine Transform (DCT). This transform works on square groups of pixels (termed "blocks"). Having transformed the picture from the spatial domain, the bandwidth may be further lowered by use of clever coding schemes such as variable-length (VLC) and run-length coding (RLC).

Noise in video arises from a variety of sources. Most basic is the wideband or Gaussian noise that comes from pickup devices (camera tubes or CCDs), film grain, analog circuits, and so forth. For signals that have been transmitted over analog links, it is also common to see impulse noise. This type of noise is especially common in satellite and microwave links (and may range in intensity from a "sparkle" or two a minute to the "waterfall" of impulses seen in a satellite feed about to go into solar outage), but impulses may also come from inside a facility (the custodian plugging a vacuum cleaner into technical power, for example). A final class of noise, which is termed "surface impairments" comes from, for example, vertical scratches present on film-stock that has been mistreated. Noise in this class may also come from signal cross talk. Once the noise is present in the signal it is very difficult to remove. Historically, techniques such as high-frequency roll-off have been employed, frequently doing more damage to the underlying pictures than the noise itself.

The filters available for reducing noise include both temporal and spatial filters (the vertical filters required external hardware). The present invention applies to spatial filtering. Basic spatial filtering, which applies horizontal and vertical low-pass filtering within a frame, discards both noise and picture detail. This technique can offer a trade off between artifacts and softer pictures, however the effect of soft pictures is easily seen. U.S. Pat. No. 6,229,578 ('578 Patent) discloses an edge-detection based noise removal algorithm. What is disclosed is a method for removing noise by distinguishing between edge and non-edge pixels and applying a first noise removal technique to pixels classified as non-edge pixels and a second noise removal technique to pixels classified as edge pixels. The methodology operates on images while in a Color Filter Array (CFA) domain prior to color interpolation, and uses techniques suited to the classification, whether edge or non-edge.

As discussed in the '578 Patent, in the art of image processing, raw images of an object/scene captured from a sensing or capture device are often subject to varying types of "noise" (elements not present in the object or environment which may nonetheless appear in the image). The noise present in an image may be due to the characteristics of the imaging system such as the sensor or processing steps subsequent to the initial image capture which may add noise while trying to achieve a different purpose. The properties and characteristics that would indicate that a pixel or region of pixels is "noisy" and the properties that would indicate a pixel or region of pixels is an edge or a fine detail of the image are difficult to distinguish. Thus, a fundamental problem with the removal of noise is that often a removal of what is indicated as noise may actually be a removal of fine edge or detail. If the fine detail or edge is removed, a blurring effect may occur within that region of the image further, in color images, the blurring effect leads to a bleeding of one color across the edge to another pixel(s). Noise removal procedures that were based upon linear filtering techniques suffered greatly from this malady and thus, a class of filtering techniques based on ranked order statistics such as the median filter were developed.

As discussed in the '578 Patent, the median filter ranks in order the intensity values belonging to a pixel P (for which the filter is being applied) and pixels in a particular neighborhood or along a particular vector about a pixel P. For example, a median filter (applied in a particular direction(s) through the pixel to neighboring pixels) applied to sample values including and about the pixel P of {12, 13, 200, 50, 14} would first be ranked in order as {12, 13, 14, 118, 200}. The so-called uni-directional finite impulse response (FIR) median hybrid filter would replace the original pixel location P that had a value of 200 with the median of the sample set which is 14. Thus, the output vector, after the filter, would be: {12, 13, 14, 50, 14}. If the value 200 were in fact part of an edge rather than noise, the smoothing caused by applying the filter as shown in the output vector values would decimate the edge feature.

As discussed in the '578 Patent, several improved median filters have been developed to compensate for this problem. One particular such median filter, the multilevel FIR median hybrid filter repeatedly takes the median filter in each direction about an image and applies at each filter the original input pixel. The multi-level median hybrid filter has averaging sub-filters that reduce the burden of sorting operations by averaging pixels in a particular filter direction, and then performing the median computation upon a smaller set of values, such as three. Thus, in a median hybrid filter, two neighboring west pixels would be averaged and the result fed to a median filter along with the average of two neighboring east pixels. The third input to the median filter is the pixel under consideration for noise removal. In other directions, a similar procedure is applied. In a three-level median hybrid filter, the first level pairs all such averaged neighboring pixels with vectors in opposing directions (north with south, etc.) and for each pair of direction averages (8 of them) feeds these into a median filter also along with the pixel of concern as a third input. The resulting median values of the first filter are again paired and along with the pixel of concern are input to a median filter. While median hybrid has been shown to work quite well in discriminating some edges, it is deficient in several respects with regard to edge detection. The median hybrid filter does not consider the noisiness of the edge itself. In other words, an edge's direction, even though eight are employed, cannot be determined with exacting accuracy. For instance, an edge feature may lie at a 33 degree vector from a particular pixel, and thus the eight directions are inadequate in determining the edge feature. In other words, a single pixel may contain a portion that is edge and a portion that is non-edge in the non-discrete world that cannot be represented in the discrete world of digital images. When applied to digital images, the median hybrid filter, if applied everywhere to all pixels, may propagate noise or shift it from pixel to pixel while attempting to remove it since there is noise along the edge feature due to the non-cardinal direction of the edge. A curved edge is a perfect example of such a problem.

U.S. Pat. No. 5,844,627 ('627 Patent) discloses structure and a method for reducing spatial noise. A digital filter for noise reduction selects between local variances obtained from adjacent pixels in the same frame and adjacent pixels in the same field. In one embodiment, the digital filter includes a filter modified from an adaptive Wiener filter which preserves edges and smoothes smooth areas of the image. A high compression ratio can be achieved in very smooth regions of the image without introducing artifacts.

As discussed in the '627 Patent, video noise reduction filters are often provided for removing artifacts ("noise") from a video image which are visible to a human viewer. The objective of noise removal is to create a visually pleasing image. Such noise-reduction filters include median filters and linear low-pass filters. Median filters often introduce additional artifacts which corrupt edges in the image. Linear low-pass filters often blur edges in the image. In general, these techniques are provided to remove visible defects from the image so that, for that purpose, introduction of such additional artifacts generally invisible to the eye is tolerated. However, in video signal processing, these "invisible" artifacts can be detrimental to other objectives, such as achieving a high compression ratio for storage and transmission of the video image. A lower compression ratio requires the video processing system to operate at either a higher bit rate (in a variable bit rate encoding application) or a lower image quality (in a fixed bit rate encoding application).

As discussed in the '627 Patent, in the prior art, the Wiener filter and its adaptive field/frame variants are noise-reduction digital filters which have been extensively studied. For example, some local Wiener filters are described in (i) "Digital Image Enhancement and Noise Filtering by Use of Local Statistics" by J. S. Lee, IEEE Transactions on Pattern Analysis and Machine Intelligence, Vol. PAMI-2, No 2, March 1985, pp. 165–168; (ii) "Refined Filtering of Image Noise Using Local Statistics", J. S. Lee, Computer Graphics and Image Processing 15, 380–389 (1981); and (iii) "Adaptive Noise Smoothing Filter for Images with Signal-Dependent Noise", Kuan et al, IEEE Transactions on Pattern Analysis and Machine Intelligence, Vol. PAMI-7, No. 2, March 1985, pp. 165–177. Specifically, local Wiener filters operate on each pixel of an image based on the mean value and the variance value of a finite number of pixels in the immediate vicinity of that pixel. Wiener filters are important in video compression processing for two reasons. First, Wiener filters remove noise that is not very visible to the eye, such as noise related to film grain. Second, as compared to the noise-reduction filters discussed above (e.g. the median filter), a Wiener filter is less prone to introduce new defects, especially those visible to the eye. Thus, Wiener filters are often used to improve compression efficiency.

FIG. 1A, corresponding to FIG. 3a of the '627 patent, shows a pixel's 3×3 neighborhood formed by pixels in the same frame, according to the prior art. The pixel to be filtered is shown in fine cross-hatching, centered among its eight neighbors in the neighborhood, which are shown in coarse cross-hatching.

FIG. 1B, corresponding to FIG. 3b of the '627 patent, shows a pixel's 3×3 neighborhood formed by pixels of the same field, according to the prior art. The pixel to be filtered is shown in fine cross-hatching, centered among its eight neighbors in the neighborhood, which are shown in coarse cross-hatching.

FIG. 1B shows the nine pixels in the 3×3 neighborhood. A neighborhood mean ("field-based mean") and a neighborhood variance ("field-based variance") are computed for each pixel, based on averaging and computing the variance of the nine pixels of the same field in the pixel's 3×3 pixel neighborhood.

FIGS. 1A and 1B show the nine pixels in the 3×3 neighborhood. For each pixel g(i,j) in the frame, the smaller of the frame-based and field-based neighborhood variances, and its associated neighborhood mean, are chosen to be the neighborhood variance (designated $\sigma_g^2(i,j)$) and neighborhood mean (designated bar-g(i,j)), respectively, for that pixel. Independently, the frame-based and field-based neighborhood variances obtained are summed and accumulated for the entire image. The resulting value is used to compute a noise variance (designated $\sigma_n^2$) for a global noise signal. Various ways are disclosed for computing $\sigma_n^2$.

U.S. Pat. No. 6,335,990 ('990 Patent) discloses a system and method for spatial temporal-filtering for improving compressed digital video. A filter that filters in the spatial and temporal domain in a single step with filtering coefficients that can be varied depending upon the complexity of the video and the motion between the adjacent frames comprises: a IIR filter, a threshold unit, and a coefficient register. The IIR filter and threshold unit are coupled to receive video data. The IIR filter is also coupled to the coefficient register and the threshold unit. The IIR filter receives coefficients, a, from the coefficient register and uses them to filter the video data received. The IIR filter filters the data in the vertical, horizontal and temporal dimensions in a single step. The filtered data output by the IIR filter is sent to the threshold unit. The threshold unit compares the absolute value of the difference between the filtered data and the raw video data to a threshold value from the coefficient register, and then outputs either the raw video data or the filtered data.

FIG. 2, corresponding to FIG. 1 of the '990 patent, is a block diagram of a video processing system including a filter used as a pre-filter, according to the prior art. This video processing system illustrates use of a filter as a pre-filter. As shown, a stream of raw video data is received at the input to the pre-filter. The pre-filter processes and filters the data, and outputs the filtered data. The output of the pre-filter is coupled to a compression unit which compresses the filtered video data and outputs the compressed data to a decompression unit. While the coupling between the compression unit and the decompression unit is shown as an electrical coupling, those skilled in the art will realize that the transmission of the compressed data may take a variety of formats including transfer across a LAN, transfer across the ISDN, transfer across the ATM, transfer across the Internet, transfer through the satellite, transfer through the cable TV or transfer to and from a floppy disk, CD-ROM or other similar suitable medium. The compressed data is provided on the input of the decompression unit. The decompression unit in turn decompresses the data to recreate the filtered video data that is then sent to the display device for presentation to the user. As used in the context of FIG. 2, the pre-filter is preferably provided with coefficients such that the filtered bit stream output after having been compressed and decompressed has a substantially better display quality as compared to bit streams that have not been filtered.

U.S. Pat. No. 6,295,382 ('382 Patent) discloses method and apparatus for establishing an adaptive noise reduction filter. The method and apparatus for adaptive noise filtering within a video graphics circuit includes determining an average intensity for a kernel of a display area. The kernel includes a plurality of pixels arranged in a particular manner, for example a square, a rectangle, etc. Next, a variance for a pixel within the kernel is determined. Based on a relationship between the average intensity and the variance, a signal-to-noise factor is determined. The signal-to-noise factor includes a noise region, a signal region, and an edge region. The pixel within the kernel is then adaptively filtered based on the signal-to-noise factor, the average intensity, and intensity of the pixel.

As discussed in the '382 Patent, an adaptive filter filters noise based on the equation:

$$Y_{out}=K*X_c+(1-K)\mu, \text{ where } K=\text{Sigma}^2/(\text{Sigma}^2_l+\text{Sigma}^2_n).$$

In this equation, $\mu$ represents the average pixel value (color, texture, alpha blending, etc.) of the pixels covered by the filter, Sigma.sup.2 represents the variance within the display screen, $\text{Sigma}^2/\text{Sigma}^2_l$ represents the local variance, and $\text{Sigma}^2_n$ represents the noise floor. Further, $\mu=(1/L*W)\Sigma i\Sigma j X i j$, where W represents the width (with respect to the x-direction) of the filter and L represents the length (with respect to the y-direction) of the filter. For example, a 3×3 filter encompassing 9 pixels where L equals 3 and W equals 3 wherein Xc represents the center pixel of the filter.

As discussed in the '382 Patent, when this filter is applied to an input video signal, it attenuates noise based on the adaptive filtering equation. In general, when there is significant noise, the K term approaches 1, thus the filter filters Xc based primarily on the pixel value of Xc (i.e., the K*Xc term dominates). When there is little noise, the K term approaches 0, thus the filter filters Xc based on the average pixel value of the pixels covered by the filter (i.e., the $(1-K)\mu$ term dominates). When the noise level is in between, both terms contribute to the filtering of the pixel providing additional filtering when it is not needed. As a result, images appear smoother than intended because definition of the edges of the images has been diluted. As such, the desired video quality is less than optimal.

One of the best known and most widely used video compression standards for encoding moving picture images (video) and associated audio is the MPEG-2 standard, provided by the Moving Picture Experts Group (MPEG), a working group of the ISO/IEC (International Organization for Standardization/International Engineering Consortium) in charge of the development of international standards for compression, decompression, processing, and coded representation of moving pictures, audio and their combination. The ISO has offices at 1 rue de Varembé, Case postale 56, CH-1211 Geneva 20, Switzerland. The IEC has offices at 549 West Randolph Street, Suite 600, Chicago, Ill. 60661-2208 USA.

The international standard ISO/IEC 13818-2 "Generic Coding of Moving Pictures and Associated Audio Information: Video", and ATSC document A/54 "Guide to the Use of the ATSC Digital Television Standard" describes the MPEG-2 encoding scheme for encoding and decoding digital video (and audio) data. The MPEG-2 standard allows for the encoding of video over a wide range of resolutions, including higher resolutions commonly known as HDTV (high definition TV).

In MPEG-2, encoded pictures are made up of pixels. Each 8×8 array of pixels is known as a "block." A 2×2 array of blocks is referred to as a "macroblock." MPEG-2 video compression is achieved using a variety of well known techniques, including prediction (motion estimation in the encoder, motion compensation in the decoder), 2-dimensional discrete cosine transformation (DCT) of 8×8 blocks of pixels, quantization of DCT coefficients, and Huffman and run-length coding. Reference frame images, called "I-frames" are encoded without prediction. Predictively-coded frames known as "P-frames" are encoded as a set of predictive parameters relative to previous I-frames. Bi-directionally predictive coded frames known as "B-frames" are encoded as predictive parameters relative to both previous and subsequent I-frames.

The MPEG-2 standard specifies formatting for the various component parts of a multimedia program. Such a program might include, for example, MPEG-2 compressed video, compressed audio, control data and/or user data. The standard also defines how these component parts are combined into a single synchronous bit stream. The process of combining the components into a single stream is known as multiplexing. The multiplexed stream may be transmitted over any of a variety of links, such as Radio Frequency Links (UHF/VHF), Digital Broadcast Satellite Links, Cable TV Networks, Standard Terrestrial Communication Links, Microwave Line of Sight (LoS) Links (wireless), Digital Subscriber Links (ADSL family), Packet/Cell Links (ATM, IP, IPv6, Ethernet).

U.S. Pat. No. 5,974,193 ('193 Patent) discloses a technique for noise reduction in association with MPEG-1 and MPEG-2 encoding of video signals.

As discussed in the '193 Patent, an MPEG transmission system allows several video, audio and associated services to be multiplexed and sent over a single digital transmission channel. The number of services and hence the cost of transmission bandwidth per service is determined by the bit rate. Any improvement in picture quality or reduction in bit rate is thus very important to a service provider.

As explained in the '193 Patent, most sources of video produce random noise: camera noise, tape noise and the digital re-transmission of existing analog services are typical examples of systems introducing noise. Although much of this noise is often biased towards the high frequency parts of the spectrum and is not particularly visible in an analog system, MPEG encoding of such material often introduces Discrete Cosine Transform (DCT) effects or artifacts that "crawl" around the picture.

As also mentioned in the '193 Patent, there are two main reasons for these effects being produced. First, the presence of noise causes many small amplitude high frequency DCT coefficients to be generated and sent in the bit stream. These coefficients tend to be more inaccurately quantized than the low frequency coefficients and are generally due to the noise only. The increase in the number of bits transmitted causes the quantization Parameters factor (QP) to become higher in order to maintain the same bit rate. The net result is that the whole picture is reduced in quality. The Forward Prediction (P) and Bi-directional prediction (B) frames that follow the Intra (I) frame try to constantly correct for the noise in the prediction path and so this results in the DCT artifacts changing from frame to frame. The second reason for the loss in picture quality is that the accuracy of the motion estimation is reduced with the presence of noise in the encoder itself. This produces even worse predictions in the 'B', and 'P' frames which inevitably increases the QP and reduces picture quality.

A spatio-temporal noise reduction scheme for interlaced video is disclosed in "Perceptive Adaptive Temporal TV-Noise Reduction using Contour Preserving Prefilter Techniques", K. Jostschulte, A. Amer, M. Schu, H. Schroeder, IEEE Transactions of Consumer Electronics, Vol. 44, No. 3, pp. 1091–1098, 1998 ("Jostschulte"). The noise reduction scheme consists mainly of a subband based temporal recursive filter which makes use of some special properties of the human visual system. This temporal system is supported by a preceding detail preserving spatial filter with low hardware expense, which consists of an image analyzing high pass filter bank and an adaptive low pass FIR-filter for noise reduction. Both the spatial and temporal noise reduction were evaluated with a large amount of simulations that result in a very good objective and subjective efficiency. Furthermore, the chain of both temporal and spatial noise reduction may even yield results which are better than the sum of pure spatial and temporal techniques.

Jostschulte is geared towards improvement of image quality techniques in consumer television receivers. One of these image quality improvement tasks is noise reduction.

The image can be corrupted by noise in different ways. Some noise sources are located in a camera and become active during image acquisition especially under bad lighting conditions. Here different types of noise are added due to the amplifiers and other physical effects in the camera. Further noise sources take effect due to transmission over analog channels, e.g. satellite or terrestrial broadcasting. Digital transmission inserts other distortions which also may have a noisy characteristic. Further noise is added by image recording devices such as VCRs. In these devices, additive white Gaussian noise or, in the case of tape drop-outs, impulsive noise is added to the signal. Because of this it can be very important in a television receiver to perform a final reduction of all these distortions.

Spatial noise reduction is performed by application of linear or nonlinear operators which use correlations within an image. But a spatial noise reduction only has a subjective and objective gain if edges are preserved. So this filter must be controlled by a special image analyzer which controls the coefficients of such a filter.

In Jostschulte, a complete system of a spatio-temporal noise reduction scheme is presented. Jostschulte aptly notes that the problem of a spatial noise reduction scheme is to eliminate spatially uncorrelated noise from spatially correlated image content. One way of doing this is with a spatial low pass filter. Such a filter can be implemented, e.g., as a horizontal, vertical or diagonal 3-tap FIR-filter as depicted in FIG. 2 of Jostschulte, which is reproduced as FIG. 3 herein. This figure is a block diagram of a simple filter for spatial noise reduction.

FIG. 4, corresponding to FIG. 4 of Jostschulte, is a block diagram of a filter for detail preserving spatial noise reduction. FIG. 5, corresponding to FIG. 5 of Jostschulte, is a diagram illustrating eight masks for filtering a pixel.

As discussed in Jostschulte, the filter is assumed to have input noise variance σ2in. The resulting output variance σ2out of this filter is given in the following equation:

$$\sigma^2_{out} = r^2 * \sigma^2_{in} + 2*((1-r)/2)^2 * \sigma^2_{in}$$

With the assumption that the filter does not influence the original image signal, the noise reduction R (ratio of signal to noise values of input and output) of such type of filter is given by:

$$R[dB] = 10*\log(\sigma^2_{in}/\sigma^2_{out}) = 10*\log(2/(3r^2 - 2r + 1))$$

The dependency of the central coefficient and the noise reduction of such a filter is depicted in Jostschulte FIG. 3 (not shown herein). For a simple cos 2-shaped filter, a noise reduction value of 4.26 dB results. The maximum is achieved for a mean filter.

As noted in Jostschulte, the disadvantage of such a system is the tendency to blur edges and lines of the image. For this reason, a spatial noise reduction has to be adaptive to the spatial image content. In other words, a spatial filter only has to be applied along object boundaries or in unstructured areas. As a result, an image analyzing step has to be applied which controls the direction of the low pass filter. This is shown in FIG. 4 (corresponding to FIG. 4 of Jostschulte).

Jostschulte mentions that several algorithms for precise detection of edge-directions are known, but that nearly all of them have in common that a hardware implementation will be very expensive. In this case, the demand was a system that is easy to implement. So another method of detecting edge-directions was chosen. It consists of a set of high pass filters which are able to detect eight different directions of edges and structures.

FIG. 5 (corresponding to FIG. 5 of Jostschulte) depicts eight different masks for directions of analyzing and filtering. All are based on a 3×3 array of pixels, with the pixel being analyzed/filtered at the center of the array. The pixel in the center of the array is, of course, included in all of the masks. As can be seen, special masks for corners are also considered. According to Jostschulte, if this were not the case, sharpness in object-corners could be lost.

Mask 1 includes the three pixels extending horizontally across the center of the 3×3 array. Mask 2 includes the three pixels extending vertically up the center of the 3×3 array. Mask 3 contains the three pixels extending diagonally, from top left to bottom right, across the array. Mask 4 has the three pixels extending diagonally, from top right to bottom left, across the array. Mask 5 includes the center right pixel and the center bottom pixel, defining a lower right corner. Mask 6 includes the center left pixel and the center bottom pixel, defining a lower left corner. Mask 7 includes the center left pixel and the center top pixel, defining a top left corner. Mask 8 includes the center right pixel and the center top pixel, defining a top right corner.

In the image analyzer, high pass filters with coefficients $\{-\frac{1}{4}; \frac{1}{2}; -\frac{1}{4}\}$ are applied along all given directions for each pixel of the image. The direction with the lowest absolute high pass output is chosen to be the direction of the local picture contour. The result is that the following low pass filter of the same direction will not blur structures in the image.

Simulations concerning the PSNR result in noise reduction values R of 1 dB up to 2 dB. The amount of noise reduction was found to be dependent on the contents of the image. In structured areas, the results were higher than in nearly unstructured areas. The loss in unstructured areas can be explained with the tendency of the analyzing filter to fail in noise structures. In such cases, the mask selection is not uncorrelated to noise. That is the reason why theoretical values of R are higher than simulated ones. But even in completely unstructured images, the noise reduction is about 1 dB.

Pre-processing video to reduce entropy by attenuating spatial noise allows a trade-off between compression and smoothing artifacts. Locally adaptable directional low pass filtering as described in Jostschulte minimizes edge blurring, but provides no means to adjust the degree of smoothing for optimized quality at a given bit rate. It would be advantageous to provide a system and methods for adjusting the degree of smoothing, thereby optimizing quality.

The present invention provides directional video filtering techniques for locally adaptive spatial noise reduction having the aforementioned and other advantages.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following glossary of terms is intended to lend clarity and consistency to the various descriptions contained herein, as well as in prior art documents:

DCT discrete cosine transform
FIR finite impulse response
MPEG Moving Picture Experts Group, a standards organization dedicated primarily to digital motion picture encoding
MPEG-2 an encoding standard for digital television (officially designated as ISO/IEC 13818, in 9 parts)
MPEG-4 A variant of a MPEG moving picture encoding standard aimed at multimedia applications and streaming video, targeting a wide range of bit rates. Officially designated as ISO/IEC 14496, in 6 parts.
PSNR Peak Signal to Noise Ratio
SNR Signal to Noise Ratio

SUMMARY OF THE INVENTION

A first filtering technique is described for spatial noise reduction in video images. The first technique provides directional video filtering for locally adaptive spatial noise reduction having the aforementioned and other advantages. The first technique can be implemented as a pre-processing filter to improve the quality of compressed video, such as MPEG-1, MPEG-2, or MPEG-4 video, including compressed video for broadcast or multi-media streaming. The first technique extends directional low pass filtering for pre-processing video sequences prior to compression by providing both parametric adjustment of degree of smoothing and reduced computational burden for simple implementation.

The first filtering technique comprises detecting object boundaries and unstructured areas in the image by applying 3-tap high pass filters to at least selected ones of the pixels in at least four, but less than eight directions to determine the best direction for local low pass filtering; and applying low pass filtering only along object boundaries and unstructured areas within the image so as to minimize the tendency to blur image edges. Using only four high pass filters to locate horizontal, vertical and diagonal image edges passing through the center of a 3×3 pixel array provides good results.

According to the invention, a second filtering technique is described for spatial noise reduction in video images.

According to the invention, a method of reducing spatial noise in an image having a plurality of pixels, the pixels being arranged in a plurality of (h) rows and (w) columns, comprises calculating low pass (smoothing) filters for a number of pixels, simultaneously, from three successive image rows, wherein: the three successive image rows comprise a mid (middle) row between an up (upper) row and a down (bottom) row; wherein the up image row represents pixels $p(i-1, j+k)$; wherein the mid image row represents pixels $p(i,j+k)$; and wherein the down image row represents pixels $p(i+1,j+k)$ for $k=[0,7]$. According to an aspect of the invention, three blocks (m1, m2, m3) are associated with the three successive image rows, and the blocks are processed in row-major order.

This implementation is applicable to both luminance and chrominance. The number of smoothing parameters has been reduced to one. Generally, spatial low pass filtering is being done just as in the first technique; the second technique includes an implementation difference for luminance pixels. Also, directional mapping is used and the technique is applied to chrominance filtering as well as center weighting adaptation based upon the number of filtering directions rather than with the fixed "α" parameter for all pixels in the image.

According to an aspect of the invention, the inventive spatial filtering technique can be extended from a 3×3 neighborhood to a 5×5 expanded neighborhood (requiring a 5×5 pixel array using pixel values from 5 successive image rows). This expanded neighborhood permits finer determination of directionality through the use of additional directional filters in between vertical/horizontal and the 45 degree diagonal filters permitted by a 3×3 pixel analysis.

According to another aspect of the invention, significant advantage can be taken of Single Instruction Multiple Data (SIMD) features of the Intel MultiMedia extensions (MMX) instruction set to implement a highly-efficient embodiment of the present inventive spatial filtering techniques.

According to an aspect of the invention, the inventive method of reducing spatial noise in an image having a plurality of pixels, the pixels being arranged in a plurality of (h) rows and (w) columns can be implemented by providing a set of three 64 bit registers, each register representing eight horizontally adjacent pixel values from one of three respective vertically adjacent image rows. Eight sets of directional high-pass values are computed, one for each horizontal pixel position represented by the registers. Directionally smoothed low pass pixel values are then computed by combining said high-pass values with image pixel values to produce directionally weighted sums.

According to another aspect of the invention, directional low pass filter values are determined in such a manner that relative amount of smoothing applied in any given direction is determined by directionality information from the high-pass filter values. Since each high-pass filter value is an indicator of image activity in the corresponding direction, larger high-pass values tend to indicate "real" edges in the image. Accordingly, less smoothing is applied across such edges.

BRIEF DESCRIPTION OF THE DRAWINGS

FIG. 1A is a diagram showing a pixel's 3×3 neighborhood formed by pixels in the same video frame, according to the prior art.

FIG. 1B is a diagram showing a pixel's 3×3 neighborhood formed by pixels of the same video field, according to the prior art.

FIG. 2 is a simplified block diagram of a video processing system including a pre-filter, according to the prior art.

FIG. 3 is a block diagram of a simple filter for spatial noise reduction, according to the prior art.

FIG. 4 is a block diagram of a filter for detail preserving spatial noise reduction, according to the prior art.

FIGS. 8A and 8B are expanded views of low pass filter maps for four and eight high pass filters, respectively, for a demonstration sub-image, according to the first technique disclosed herein.

FIG. 9 is a diagram of all orientations of 15 total low pass filter weights for number of equal directions using four high pass filters, according to the first technique disclosed herein.

FIG. 10 is a table showing low pass filter weights for number of equal directions (D), using eight high pass filters, according to the first technique disclosed herein.

FIG. 13 is a diagram of sample high pass filter totals (top) and sum for 256 low pass filters (α=15/16, relative center weighting=53%), according to the first technique disclosed herein.

FIG. 14 is a diagram illustrating four high-pass 3×3 filters for vertical, diagonal left, diagonal right and horizontal directions, according to the invention.

FIG. 15 is a diagram illustrating MMX Registers for 8-byte blocks of pixel data from three successive image rows, according to the invention.

FIG. 16 is a diagram illustrating byte-wise processing to compute eight vertical high-pass filter absolute values and signs, according to the invention.

FIG. 21 is a diagram illustrating layout for directional high pass filters in 3×3 and 5×5 neighborhoods, according to the invention.

FIG. 22 is a diagram illustrating the relative values of zero-mean high pass filters in four directions for 5×5 neighborhood (mid pixel value of +2), according to the invention.

FIG. 23 is a diagram illustrating Map of pixel usage for all 4-directional high pass filters in 5×5 neighborhood, according to the invention.

FIG. 24 is a diagram illustrating Description of eight filter directions for 5×5 pixel array, according to the invention.

FIG. 25 is a diagram illustrating zero-mean high pass filters for Lesser (+/−27) and Greater (+/−63) angles in 5×5 array, according to the invention.

FIG. 26 is a diagram illustrating Map of pixel usage for all 8-directional high pass filters in 5×5 neighborhood

FIG. 31 is a diagram illustrating data organization for simultaneous processing of four pixels using five 64-bit MMX registers, according to the invention.

FIG. 32 is a diagram illustrating Overlapped 8 byte blocks for 4-byte processing of pixel data with 3 image rows, according to the invention.

FIG. 33 is a diagram illustrating the effect of MMX instructions implementing column advance with word insertion, according to the invention.

FIG. 34 is a diagram illustrating the effect of MMX instructions used to save four high bytes in low bytes for a next column, according to the invention.

FIG. 35 is a diagram illustrating the effect of MMX instruction implementing alignment and averaging for vertical and horizontal high pass filter directions, according to the invention.

FIG. 36 is a diagram illustrating the effect of MMX instructions implementing alignment and averages for left and right diagonal high pass filter directions, according to the invention.

FIG. 37 is a diagram illustrating the effect of the MMX 'shuffle' instruction to store four middle row pixels in both low and high and high bytes, according to the invention.

FIG. 38 is a diagram illustrating the effect of MMX instructions implementing calculation of absolute values & signs for vertical and horizontal high pass filters, according to the invention.

FIG. 39 is a diagram illustrating the effect of MMX instructions implementing calculation of absolute values & signs for left and right diagonal high pass filters, according to the invention.

FIG. 42 is a diagram illustrating the effect of MMX instructions implementing conversion of high pass results to composite low pass filter results, according to the invention.

FIG. 43 is a diagram illustrating the effect of MMX instructions implementing correction of low pass filter sums, according to the invention.

FIG. 44 is a diagram illustrating the effect of MMX instructions implementing final processing and storage of smoothed pixels, according to the invention.

FIG. 45 is a diagram illustrating the effect of MMX instructions implementing storage of a direction map, according to the invention.

FIG. 46 is a diagram illustrating 5×5 high-pass sums above low-pass filters for number of directions D=[1,4] (top) and D [5,8] (bottom), according to the invention.

DETAILED DESCRIPTION OF THE INVENTION

The invention relates generally to directional adaptive filters for spatial noise reduction pre-processing in conjunction with video compression. More specifically, the directionally adaptive spatial smoothing filters described herein are based upon applying low pass filtering only along object boundaries and unstructured areas so as to minimize the tendency to blur image edges.

Local edge detection for each pixel in an image may be accomplished by applying 3-tap high pass filters in eight directions to determine the best direction for local low pass filtering, such as has been described in "Perception Adaptive Temporal TV-Noise Reduction Using Contour Preserving Prefilter Techniques", Jostschulte, K., Amer, A., Schu, M., Schroeder, H., IEEE Trans. of Consumer Electronics, Vol. 44, No. 3, pp. 1091–1096 ("Jostschulte"). Jostschulte has been discussed, hereinabove.

Several enhancements to the basic directional low pass filtering algorithm as presented in Jostschulte have been developed for the spatial noise reduction method. The following specific additions to the basic approach both simplify directional denoising implementation and add considerable flexibility for adjusting the degree of smoothing required to maximize video quality for a desired bit rate:

1. Reduction of the number of high pass directional filters from eight to four reduces the computational burden by a factor of two.
2. Application of multi-directional low pass filtering when high-pass results are nearly (substantially) equal in absolute value results in filter shape variation without explicit tap weight changes.
3. Introduction of an offset parameter promotes smoothing even when the minimum absolute value of the high pass filters is zero.
4. Variance of relative weighting of center low pass filter coefficient from zero to unity offers additional adjustment in the degree of smoothing applied.

Details and results of these adaptations are discussed herein below. The basic directional smoothing algorithm will be described. Filter design improvements including filter number reduction, multi-directional averaging with offset, and center weighting variation will also be described.

Directional Filer Design

Figures 5, 6, 7:
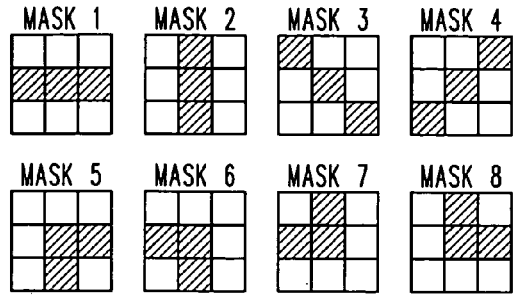
FIG. 5 is a diagram illustrating eight masks for a filter, according to the prior art.
FIG. 6 is a diagram illustrating eight high-pass 3×3 filters to determine local edge directionality, according to the prior art.
FIG. 7 is a table listing directionality effects for the reduction in the number of filters from eight to four, according to an example demonstration sub-image in accordance with the first technique disclosed herein.

Directionally adaptive spatial noise reduction is based upon restricting local low pass filtering to directions that do not cross image edges. As shown in FIG. 6, simple 3-tap zero-mean high pass filters used to determine the optimum direction for smoothing have coefficients $\{-\frac{1}{4}, \frac{1}{2}, -\frac{1}{4}\}$. The set of four high pass filters in the top row (d=0, d=1, d=2, d=3) can be used to locate horizontal, vertical and diagonal edges passing through the center of a 3×3 pixel array. The bottom row in the figure shows four additional filters (d=4, d=5, d=6, d=7), which are recommended by Jostschulte for determining edges with right angle corners through the center. Comparing results of the eight high pass filters with the minimum absolute value for each pixel in the image is chosen as the direction for low pass filtering using the coefficients $\{\frac{1}{4},\frac{1}{2},\frac{1}{4}\}$.

Generally, the eight high pass filters illustrated in FIG. 6 correspond to the eight masks illustrated in FIG. 5, as follows:

| Nomenclature | FIG. 5 | FIG. 6 |
| --- | --- | --- |
| horizontal | mask 1 | d = 3 |
| vertical | mask 2 | d = 1 |
| diagonal, right | mask 3 | d = 2 |
| diagonal, left | mask 4 | d = 0 |
| corner, low-right | mask 5 | d = 7 |
| corner, low-left | mask 6 | d = 6 |
| corner, up-left | mask 7 | d = 5 |
| corner, up-right | mask 8 | d = 4 |

The step-by-step process for basic directional smoothing proceeds as follows:

1. For each pixel p(i,j) in a video frame of I rows by J columns, compute a set of zero-mean high-pass filters with tap weights $\{-\frac{1}{4}, \frac{1}{2}, -\frac{1}{4}\}$ in accordance with equation (1):

$$hp\_filt(i, j, d) = \begin{cases} (2p(i, j) - p(i-1, j+1) - p(i+1, j-1))/4 & d = 0, \text{(diagonal\_left)} \\ (2p(i, j) - p(i-1, j) - p(i+1, j))/4 & d = 1, \text{(vertical)} \\ (2p(i, j) - p(i-1, j-1) - p(i+1, j+1))/4 & d = 2, \text{(diagonal\_right)} \\ (2p(i, j) - p(i, j-1) - p(i, j+1))/4 & d = 3, \text{(horizontal)} \\ (2p(i, j) - p(i-1, j) - p(i, j+1))/4 & d = 4, \text{(corner\_upper\_right)} \\ (2p(i, j) - p(i-1, j) - p(i, j-1))/4 & d = 5, \text{(corner\_upper\_left)} \\ (2p(i, j) - p(i, j-1) - p(i+1, j))/4 & d = 6, \text{(corner\_upper\_left)} \\ (2p(i, j) - p(i, j+1) - p(i+1, j))/4 & d = 7, \text{(corner\_lower\_right)} \end{cases}$$

(The top and bottom horizontal rows, and the leftmost and rightmost vertical columns in the 3×3 array can either be left unfiltered, or can be computed by replicating to produce an (I+1) by (J+1) image).

2. Determine the high-pass filter with the minimum absolute value as expressed in equation (2):

$|hp\_min(i,j,d_{min})| = \min_d(|hp\_filt(i,j,d)|)$

3. Apply a simple unity gain 3×3 low pass filter with tap weights {¼, ½, ¼} in the direction of $d_{min}$ for local smoothing of the image pixel p(i,j). Direct calculation from the signed value can be easily be computed by simple subtraction:

$lp\_filt(i,j) = p(i,j) - |(hp\_filt(i,j,d_{min})|$

Reduction in Number of Directional High Pass Filters

For a sample image (sub-image, or selected portion of a larger video frame) having 72×72 (5184) pixels, and containing edge features, the absolute values for eight high pass filters (d=[0,7]) were determined. The results were mapped, using a pseudo-color bitmap technique, wherein the effectiveness of each filter in distinguishing edge features could be compared, one against the other. A pseudo-color bitmap for a local maximum ("best of the eight") high pass filter absolute value of all eight directions was also generated wherein the edge features were prominently visible. In this manner, the results could be visualized, and subjectively rated.

According to an aspect of the invention, a reduced number of directions are used for spatial noise reduction (smoothing). In order to determine the effectiveness of using a reduced number of directions for spatial noise reduction, using the same sample image, results were determined using only the four high pass filters shown in the top row of FIG. 6 (i.e., d=0, d=1, d=2, d=3). It was observed that, although somewhat less distinctly, the edges seen previously for eight high pass filters were still visible for the maximum absolute value of only the two diagonal, one vertical and one horizontal directions (d=[0,3]) using the same color scale. Four high pass filters provide satisfactory performance. Five, six or seven could be used, but that would partially defeat the purpose of the invention, which is to reduce the number of high pass filters and directions, thereby simplifying the overall design.

Color maps were also generated illustrating the degree of low pass filtering that will result for the minimum direction for the cases of both four and eight filters. Comparing these two bitmaps, it became apparent that while they both exhibit a large number of zero |hp_min(i,j,$d_{min}$)| minima, the number of pixels unchanged by low pass filtering will be far greater when eight filters are used.

In addition to comparing the position and degree of low pass filtering, it is also useful to observe directionality effects for the reduction in the number of filters from eight to four. Distribution statistics for each filtered pixel in the demonstration sample sub-image were calculated by summing the number of high pass directions for which the absolute value matches that of the minimum. The relative occurrences of the equality |hp_filt(i,j,d)|=|hp_min(i,j,$d_{min}$)| for each direction are listed in the table of FIG. 7 as percentages (%) of a total of 72*72=5184 filtered pixels, for both d=[0,3] (column 2) and d=[0,7] (columns 3 and 4). (Column 3 relates to the horizontal, vertical and two diagonal filters for the case of eight filters, and Column 4 relates to the corner filters for the case of eight filters.)

In FIG. 7, it can be seen that while the distribution is rather constant across the eight directions (14%–26%) in this particular example, that the distribution for only four filters is heavily skewed toward the vertical (65%) and the diagonal left (48%) directions.

In the example demonstration sub-image shown in FIG. 7, it can be seen that the totals for the two cases of d=[0,3] and d=[0,7] are 139% and 160%, respectively. The way to take advantage of these distribution totals in excess of 100% will be described in greater detail, herein below, in a discussion of multi-directional averaging.

The demonstration sub-image (72×72 pixels) was further processed. To accentuate low pass filter directions, extra rows and columns were inserted so that each pixel in a filtered sub-image is displayed as a 3×3 array. The processing steps are:

1. Create 216×216 arrays for each direction by adding 2 rows and 2 columns between each pixel p(i,j) in the 72×72 sub-image. (216=72×3)
2. Assign values of {1,2,1} to the appropriate 3 pixels in the 3×3 array centered on p(i,j) for each high pass filter direction d for which the absolute value matches that of |hp_min(i,j,$d_{min}$)| as defined in equation (2)
3. Sum over the number of directions considered, and create a bitmap (e.g., having shading corresponding to values).

Visual comparison of the two bitmaps so computed for four and eight filters showed similarities as well as differences. For a first region in the sub-images, the maps exhibited filtering primarily in the left diagonal (d=0) direction. Conversely, while contributions inside another region in the sub-image 4-filtered pseudo-image (d=[0,3]) were again dominated by left diagonal filtering, those on the 8-filtered pseudo-image (d=[0,7]) reflected low pass filtering in the right-angle corner directions as well.

FIGS. 8A and 8B are expanded views of low pass filter maps for four and eight high pass filters, respectively, for a demonstration sub-image, showing relative weighting for D=[1,4] and D=[5,8] equal directions (filter normalization sums equal 4D for D=[1,8]).

Multi-directional Averaging

As evidenced by the directional distribution totals in excess of 100% recalled from FIG. 7 for the demonstration sub-image, the value of |hp_filt(i,j,d)| can match that of |hp_min (i,j,$d_{min}$)| for more than a single value of d. The non-central pixels having values of 2 or greater in both low pass filter direction maps in FIGS. 8A and 8B also demonstrate the occurrence of D>1 equal directions, and the 3×3 pixel arrays show expanded views of examples that occur in the demonstration sub-image for D=[1,4] and D=[5,8]. In order to achieve a greater degree of smoothing for these cases where the number of equal directions is greater than one, the expression for computing a local low pass filter can be easily modified to average over D directions of high-pass results. Denoting each direction to be included in the average by the index $d_m$, the expression in equation (3) for local low pass filtering in a single direction is generalized to include D of them as shown in equation (4):

$$\text{lp\_filt}(i, j) = p(i, j) - \sum_{m=1}^{D} (\text{hp\_filt}(i, j, d_m))/D$$

Using the averaging shown in the above expression, a wide variety of filter shapes is achievable without explicit changes to coefficient values. As illustrated in FIG. 9 for four high pass filters, there is a total of $$\sum_{m=1}^{4} \binom{4}{m} = 15$$

low pass filter combinations for the number of equal directions D=[1,4]. The fractional values are shown in the drawing. Note that center weighting is fixed at ½ for all D, and other nonzero coefficients are equal to 1/(4D).

FIG. 9 illustrates all orientations of fifteen total low pass filter weights for number of equal directions using four high pass filters.

FIG. 10 is a table of low pass filter weights for number of equal directions (D) using eight high pass filters. The number of different filters (N) is in the rightmost column.

When eight directional high pass filters are used, there are a total of 255 different low pass filter combinations. For each value of D=[1,8], the possible tap weight values and number of filter combinations, $$N = \binom{8}{D},$$

are tabularized in FIG. 10. Regardless of the number of directions averaged, the center coefficient is again fixed at a value ½. The other fifteen distinct fractional off-center tap values have a maximum of ¼ for D=[1,3] and a minimum of 1/32 for D=8.

Figure 11A:
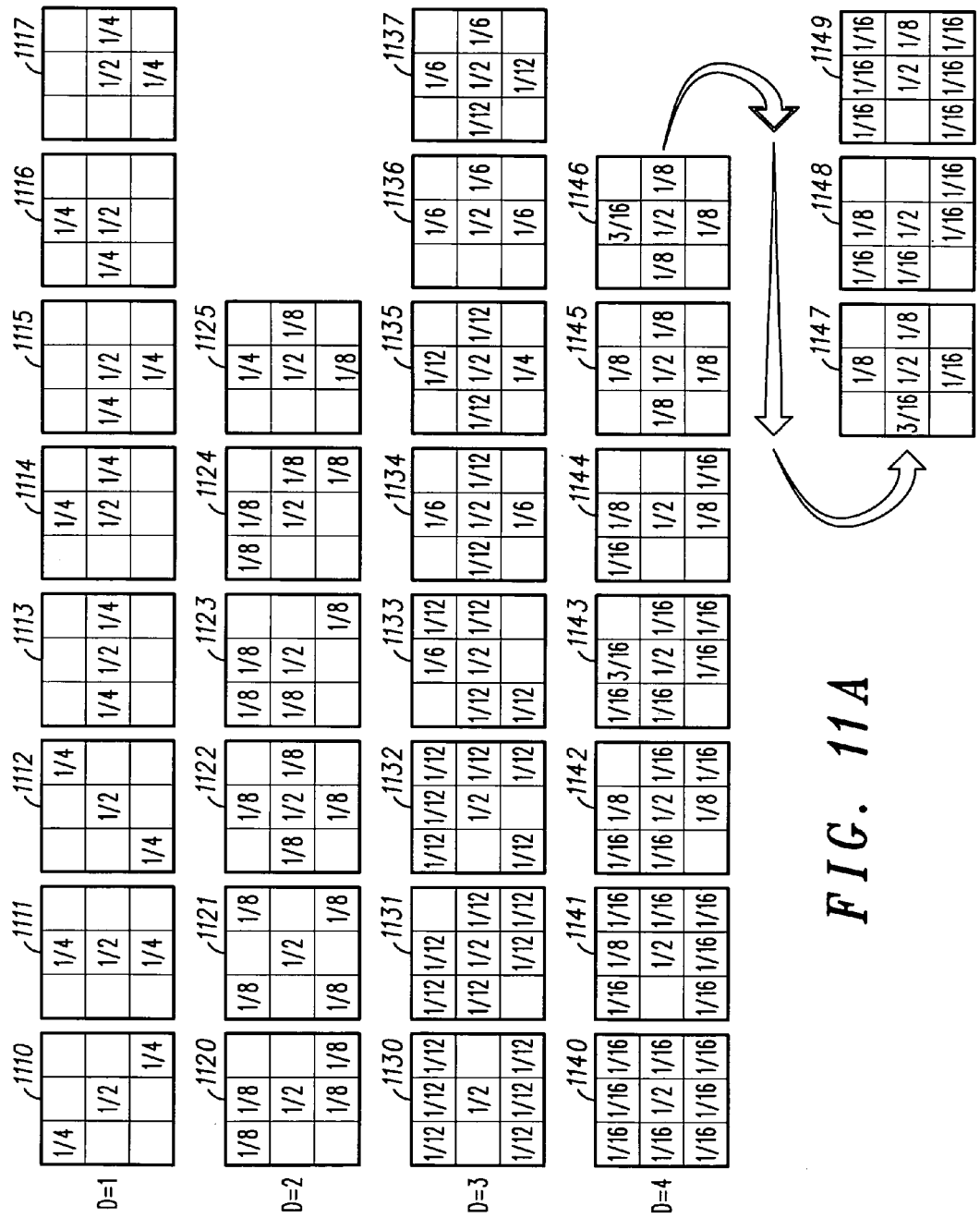
FIGS. 11(A and B) are diagrams showing low pass filter combinations for eight high pass filter directions D=[1,8], according to the first technique disclosed herein.
Figure 11B:
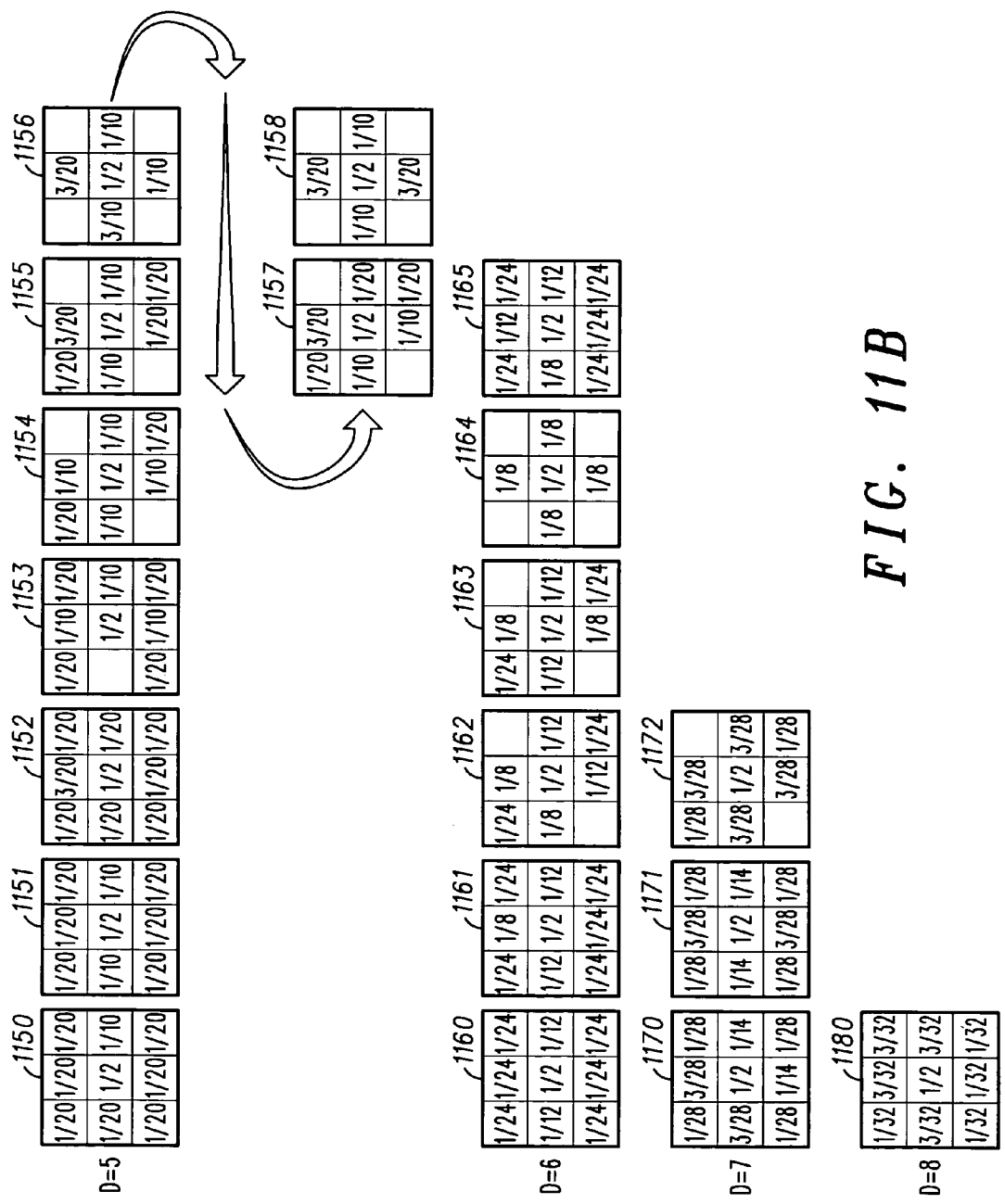

FIGS. 11(A and B) provides a more visual illustration of low pass filter combinations for eight high pass filter directions D=[1,8]. FIGS. 11A and 11B show low pass filter shapes for D=[1,8]. FIG. 11A shows D=[1,4], FIG. 11B shows D=[5–8]). In FIG. 11, the number of orientations is shown in the center of each 3×3 array. The center pixel values for each array is ½.

Because of the high number of filters possible, only a single orientation is displayed for each filter shape. The following table indicates the number of similar shapes achievable by either rotation or reflection about horizontal or vertical axes:

Table of number of orientations for each filter kernel D=[1,8]

| D = 1 | | D = 2 | | D = 3 | | D = 4 | | D = 5 | | D = 6 | | D = 7 | | D = 8 | |
|---|---|---|---|---|---|---|---|---|---|---|---|---|---|---|---|
| kernel | # | kernel | # | kernel | # | kernel | # | kernel | # | kernel | # | kernel | # | kernel | # |
| 1110 | 1 | 1120 | 4 | 1130 | 2 | 1140 | 3 | 1150 | 8 | 1160 | 4 | 1170 | 4 | 1180 | 1 |
| 1111 | 1 | 1121 | 1 | 1131 | 6 | 1141 | 8 | 1151 | 4 | 1161 | 1 | 1171 | 2 | | |
| 1112 | 1 | 1122 | 3 | 1132 | 4 | 1142 | 8 | 1152 | 4 | 1162 | 4 | 1172 | 2 | | |
| 1113 | 1 | 1123 | 5 | 1133 | 24 | 1143 | 8 | 1153 | 4 | 1163 | 5 | | | | |
| 1114 | 1 | 1124 | 3 | 1134 | 4 | 1144 | 8 | 1154 | 5 | 1164 | 3 | | | | |
| 1115 | 1 | 1125 | 12 | 1135 | 4 | 1145 | 3 | 1155 | 8 | 1165 | 12 | | | | |
| 1116 | 1 | | | 1136 | 4 | 1146 | 4 | 1156 | 4 | | | | | | |
| 1117 | 1 | | | 1137 | 8 | 1147 | 8 | 1157 | 17 | | | | | | |
| | | | | | | 1148 | 16 | 1158 | 2 | | | | | | |
| | | | | | | 1149 | 4 | | | | | | | | |
| total #> | 8 | | 28 | | 56 | | 70 | | 56 | | 28 | | 8 | | 1 |

Note that the total of these integers for each of D=[1,8] is in agreement with the value of N given in the rightmost column of FIG. 10.

For D=1, eight filter kernels 1110 . . . 1117 are illustrated, and N=8.

For D=2, six filter kernels 1120 . . . 1125 are illustrated, and N=28.

For D=3, eight filter kernels 1130 . . . 1137 are illustrated, and N=56.

For D=4, ten filter kernels 1140 . . . 1149 are illustrated, and N=70.

For D=5, nine filter kernels 1150 . . . 1158 are illustrated, and N=56.

For D=6, six filter kernels 1160 . . . 1165 are illustrated, and N=28.

For D=7, three filter kernels 1170 . . . 1172 are illustrated, and N=8.

For D=8, one filter kernel 1180 is illustrated, and N=1.

The filter kernels (1110, 1111, 1112, 1113, 1120, 1121, 1122, 1130, 1131, 1140) outlined in bold for D=[1,4] in FIG. 11 indicate that ten of the 51 low pass filter shapes displayed are also achievable using only four directional high pass filters. Note that because of the reuse of p(i±1, j) and p(i,j±1) for right angle corner filters d=[5,8], greater weight tends be assigned to these four pixels immediately adjacent to p(i,j) than to the four diagonal neighbors p(i±1, j±1), particularly for high numbers of equal directions (D>4).

In order to take full advantage of the multi-directional low pass filter shapes offered by the averaging in equation (4), a non-negative offset parameter, Δ, can be introduced so that all directions of k for which $|hp\_filt(i,j,d)|-hp\_min(i,j,d_{min}) \leq \Delta$ are included in the average. Using a value of Δ greater than zero can promote low pass filtering at p(i,j) where hp_min(i,j,$d_{min}$)=0, thereby decreasing the number of pixels for which no local smoothing would otherwise be applied.

Center Weighting Variation

According to a feature of the invention, added flexibility in low pass filter shape can be achieved rather easily by variation in the relative weight of the center tap. While the averaging expression in equation (4) assigns a fixed value of ½ to the center pixel of the 3×3 array, this relative weight can be varied in the range of unity (which is the identity filter), down to zero, which gives the weighted average of only two, four, six or eight neighboring pixels around p(i,j). Such variation is accomplished by introduction of the parameter α=[0,2] into the calculation of the unity-gain local low pass filter as shown in the following equation (5):

$$lp\_filt(i, j) = p(i, j) - \alpha \cdot \sum_{m=1}^{D} (hp\_filt(i, j, d_{\min}))/D$$

The smoothing effects from low pass filtering are increasingly strong as α increases; nominal low pass filtering with ½ assigned to the center coefficient is achieved for α=1, and the value of the center pixel p(i,j) is completely ignored for α=2.

MatLab Simulation and Results

A MatLab simulation was performed to evaluate the techniques described herein above. MatLab is a well known tool for doing numerical computations with matrices and vectors, available from The MathWorks, Inc., 3 Apple Hill Drive, Natick, Mass. 01760-2098.

Figure 12:
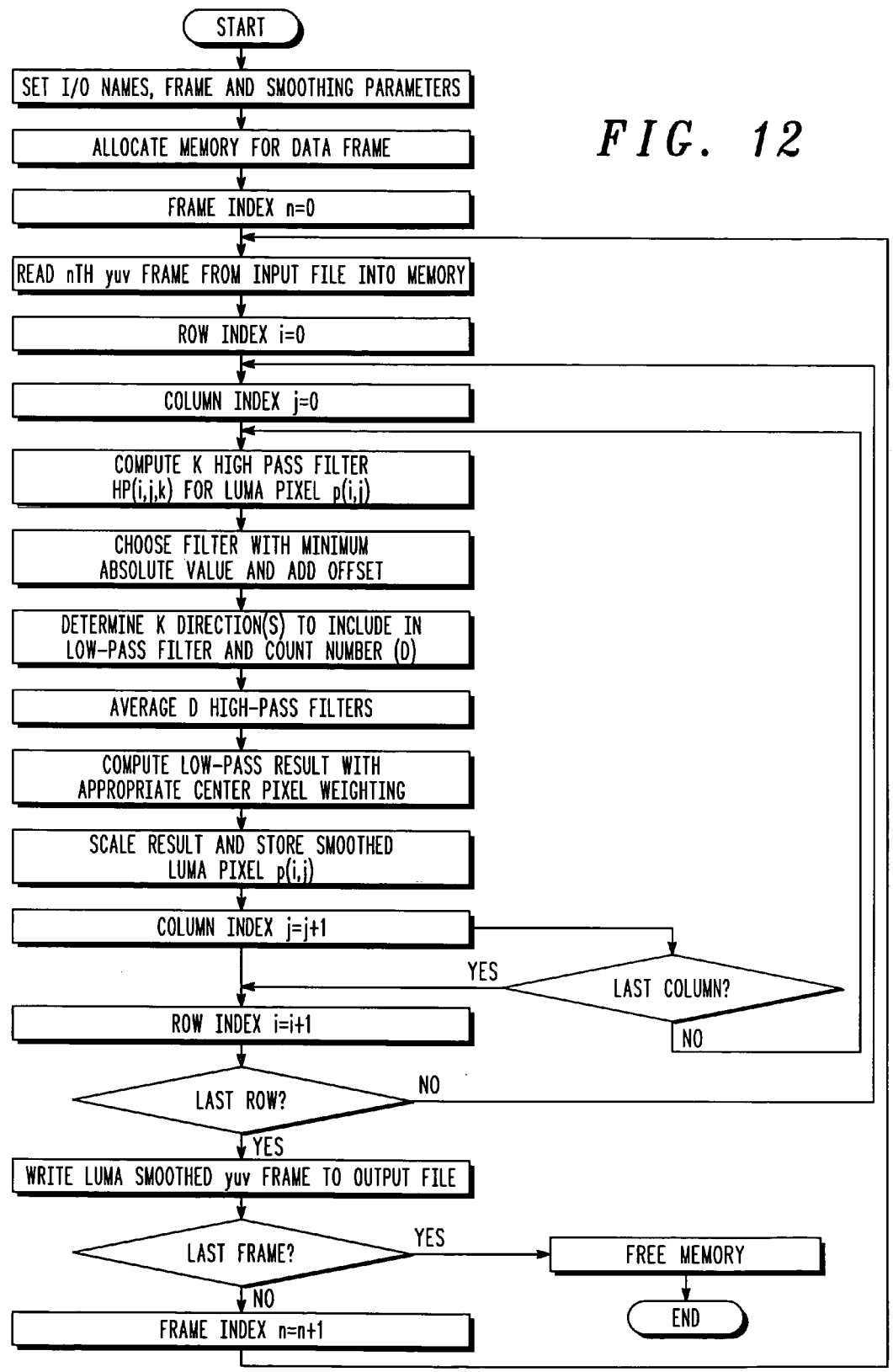
FIG. 12 is a flowchart of a software routine for a high-level processing flow for adaptive directional spatial low-pass filtering, according to the first technique disclosed herein.

The MatLab implementation of adaptive directional spatial low-pass luminance filtering follows the high-level processing described in the flowchart of FIG. 12, which indicates the modifications presented herein above—namely, a reduced set of four directional high pass filters, multi-directional averaging with offset parameter Δ, and center weighting variation settable to either the standard fixed value of ½ or automatically varying to any value between two parameters depending upon the local value of hp_min(i,j,$d_{min}$)+Δ. All calculations are done on an array basis, using unsigned 8-bit integer input and output luminance images and double precision working arrays for computations of intermediate values.

Grayscale versions of pseudo-color images showing which of four directions are included in local low pass averages were generated for several sample frames of different video sequences. Grayscale images for each of the four directions showed low pass contributions to the local average. Excluded from low pass filtering, local edges occurred in the expected directions to form outlines of the objects within the sample frame. For object boundaries more than one pixel in width, extended edges appeared as double lines. It was noted that minimal blurring of object details, such as the eyes and mouth of persons in sample frames, occurred by avoiding averaging across the short local edges in one or more of the four directions. In order to maximize contrast, both the original and smoothed images were displayed in a pseudo-color palette converted to grayscale. Comparison of the original and smoothed images showed that edge detail is well preserved in the directional smoothing process for nominal center weighting of ½(α=1).

The effect of variation in center weighting was also demonstrated. This was done by generating pseudo-color images representing the absolute value of pixel differences between images before and after smoothing, for the sample frames, for relative center weights of 25% and 50%. Comparison of pseudo-images for α=1.5 and α=1 showed higher difference values due to the greater degree of smoothing resulting from decreasing center weighting from ½ to ¼.

The approach used to evaluate the effectiveness of spatial noise reduction was to compare encoded bitrates of these sequences with and without luminance smoothing for fixed quantization (Q) values. As listed in the table below, three versions of directional filtering with an offset value of Δ=4 were compared; adaptive center weighting was performed for both eight and four high pass filters, while a fixed value of α=1 was used to assign the standard center tap value of ½.

| Naming convention for spatial noise reduction filters: | |
|---|---|
| Algorithm | Description |
| A | 8-filter directional (Δ = 4, adaptive α = [0, 1.5]) |
| B | 4-filter directional4a (Δ = 4, adaptive α = [0, 1.5]) |
| C | 4-filter directional4 (Δ = 4, fixed α = 1) |
| D | adaptive wiener_3 × 3 |
| E | adaptive wavelet |
| F | 3 × 3 median |

After applying each of the above algorithms to luminance pixels in each frame of several test video sequences, compression was performed using an encoding tool, at fixed quantization values. Averaged over all frames in each sequence, PSNR values were plotted in dB as a function of log data rate for unfiltered and smoothed sequences. All relatively straight lines, the graphs showed reductions in both PSNR (measured against the uncompressed original sequence, PSNR values for smoothed sequences reflect loss due to low pass filtering as well as compression) and data rate compared to unsmoothed results for Q=4,8,12. It was noted that, without denoising, the data rate required to encode at Q=4 varied from only 272 kbps for one sequence to more than 1.9 Mbps for another of the video sequences. Although PSNR loss due to smoothing with the six algorithms also depends upon the sequence and data rate, MatLab's median (F) filter consistently showed by far the most drastic reductions. Of the adaptive algorithms, MatLab's Wiener (D) filter exhibited the most aggressive smoothing, and eight-filter directional (A) and wavelet-based (E) denoising tended to show the least.

Recognizing the lack of correlation between PSNR and perceived video quality, side-by-side subjective evaluations at three bit rates for five sequences and numerous algorithms were made by three expert viewers. To facilitate comparisons of subjective quality with and without spatial luminance noise reduction at comparable data rates, the original sequences were encoded for all values of Q in the range [4,16] using the approach described below.

The general observations for subjective testing results are:
1. Both 3×3 Wiener and median filters consistently degrade video quality,
2. Adaptive de-noising for four-directional (B and C) and wavelet based (W) algorithms result in perceived quality at least as good as that for unfiltered sequences in all cases, 3. Performing somewhat worse than either B or C, directional filtering using eight filters (A) showed slight degradation for 'mobile-calendar' and 'hall' sample sequences.

Comparative evaluations were made of the adaptive and nonlinear filters for two of the video sequences. The results for these sequences also demonstrated the effectiveness of adaptive directional and wavelet-based filters for spatial noise reduction.

Implementation in C

Having used MatLab simulations to establish the potential effectiveness of four-directional filtering in spatial denoising, the enhanced noise reduction algorithm has been implemented in C for inclusion as a pre-processing option for an Offline Encoder. A stand-alone version with fixed offset ($\Delta$) and center tap weighting ($\alpha$) parameters, the C implementation follows the high-level flowchart in FIG. 12, using 16-bit integer arithmetic exclusively, without any division required for averaging or normalization and without loss of precision in the calculation of intermediate values.

Integer operation with maximum precision was made possible by simply scaling up fractional tap values described hereinabove, using 16-bit integers for intermediate results, deferring normalization to the final step, restricting all denominators to powers of two and rounding final eight-bit output values. Based upon scaled high pass coefficient values $\{-1, 2, -1\}$, the four 3×3 arrays in the first row of FIG. 13 show sample orientations of total high pass tap weights resulting from summing over D=1, 2, 3 or 4 equal directions. Multiplication by an integer whose value depends on both D and $\alpha$ before subtracting from appropriately scaled center pixel p(i,j) produces non-negative low pass filter coefficients such as those for center tap weighting of 53% appearing in the bottom row of FIG. 13. This figure is a diagram of sample high pass filter totals (top) and the sum of gain-256 low pass filters ($\alpha$=15/16, relative center weighting=53%).

For hp_filt(i,j,d) high pass filter taps four times those defined in equation (1) set forth above, and integer multiplicative weighting factors denoted by w($\alpha$,D), the general expression for 16-bit low pass average with coefficients summing to integer M is given by the following equation (6):

$$M \cdot \text{lp\_filt}(i, j) = M \cdot p(i, j) - w(\alpha, D) \sum_{m=1}^{D} \text{hp\_filt}(i, j, d_m)$$

Choosing M to be a power of two, the final rounded eight-bit low pass filter output for pixel p(i,j) can be computed by simply adding M/2 and shifting right by $\mu = \log_2 (M)$ bits.

$$lp\_filt(i,j) = (M \cdot lp\_filt(i,j) + M/2) >> \mu$$

Requiring that M be a power of two and restricting all weighting factors to integer values limits the achievable values of the center weighting parameter $\alpha$. These values are listed in the following Table (for M=256) as an indexed array showing $\alpha$(n), the associated center weighting percentage, and w (n,D) for D=[1,4] directions. Although these weighting factors can easily be computed by:

$w_n(3) = n >> 2$ $w_n(1) = 3 \cdot w_n(3)$ $w_n(2) = w_n(1) >> 1$ $w_n(4) = w_n(2) >> 1$ they can also preferably be stored as a look-up-table. Note that the indices n=[0,10] give center weightings from 100% down to 6% for all values of D, with integer multiplication.

TABLE

Center weights, alpha and multipliers for computation of low pass filter from high pass filter totals

| index (n) | alpha $\alpha$(n) | center weight | high pass weighting values: w(n, D) | | | |
|---|---|---|---|---|---|---|
| | | | D = 1 | D = 2 | D = 3 | D = 4 |
| 0 | 0 | 100% | 0 | 0 | 0 | 0 |
| 1 | 3/16 | 91% | 12 | 6 | 4 | 3 |
| 2 | 3/8 | 81% | 24 | 12 | 8 | 6 |
| 3 | 9/16 | 72% | 36 | 18 | 12 | 9 |
| 4 | 3/4 | 63% | 48 | 24 | 16 | 12 |
| 5 | 15/16 | 53% | 60 | 30 | 20 | 15 |
| 6 | 1 1/8 | 44% | 72 | 36 | 24 | 18 |
| 7 | 1 5/16 | 34% | 84 | 42 | 28 | 21 |
| 8 | 1 1/2 | 25% | 96 | 48 | 32 | 24 |
| 9 | 1 11/16 | 16% | 108 | 54 | 36 | 27 |
| 10 | 1 7/8 | 6% | 120 | 60 | 40 | 30 |

It should be appreciated that the value if M can be varied to provide finer (M=256) or coarser (M<256) gradations.

While 53% center weighting worked well for the relatively clean sequences, very noisy images required more aggressive smoothing. It was experimentally determined that the parameters $\alpha$(7)=21/16 for 34% center weighting and an offset of $\Delta$=32 do result in significant reduction in spatial noise. When displayed using a pseudo-color palette displayed in grayscale, speckles seen in a sub-image of a single frame of the noisy video sequence were visibly reduced in the directionally smoothed sub-image. And, importantly, text within the smoothed sub-image was still legible.

The problem of using fixed parameters is that the degree of smoothing should be adjusted for the source sequence and the desired bit rate. In another test, it was experimentally shown that when $\alpha$(7) and $\Delta$=32 was applied to the another image sequence, the noticeable blurring of facial detail will only be acceptable for very low bit rates where compression artifacts dominate. Depending on the operational scenario, it may be advisable to allow the user to choose the degree of smoothing if a robust method for automatic adjustment in offset and center tap weighting parameters cannot be developed.

MMX Implementation of Directional Spatial Video Noise Reduction

There has thus been described a first technique for reducing spatial noise in an image having a plurality of pixels, comprising detecting object boundaries and unstructured areas in the image by applying 3-tap high pass filters to at least selected ones of the pixels in at least four, but less than eight directions to determine the best direction(s) for local low pass filtering; and applying low pass filtering only along object boundaries and unstructured areas within the image so as to minimize the tendency to blur image edges.

Recent versions of Pentium microprocessors manufactured by Intel Corporation of Santa Clara, Calif. include a set of "extra" instructions that implement matrix math extensions. Processors that incorporate these extensions, which implement "SIMD" (Single Instruction Multiple Data) features, are generally referred to by Intel as "MMX enhanced" processors, and the "extra" instructions are generally referred to as the "MMX instruction set". Registers specific to the MMX instruction set are generally referred to as "MMX registers". When properly utilized, the SIMD features of the MMX enhanced processors can provide significant performance improvements in processing speed for digital signal processing applications such as image processing, digital audio processing, motion video compression/decompression, etc.

There follows a discussion of an MMX implementation of directional spatial video noise reduction. This implementation is applicable to both luminance and chrominance. The number of smoothing parameters has been reduced to one. Generally, the MMX implementation of spatial low pass filtering is accomplished as in the first technique. The discussion hereinbelow details certain advantageous adaptations of the first technique aimed at making efficient use of the MMX instruction set. More particularly, in adapting the invention directional spatial filtering techniques described hereinabove for MMX implementation, directional mapping is employed and alterations are made to the processing of luminance pixels. Further, the MMX implementation of the inventive directional spatial filtering technique permits center weighting adaptation based upon the number of filtering directions (as opposed to a fixed "α" parameter), and is applicable to chrominance filtering.

In the MMX implementation, the same directional low pass filtering is being done for luminance pixels, except center weighting variation is locally-adaptive rather than set by an input parameter applied to the entire image.

FIGS. 1–13 and accompanying text, hereinabove, describe an approach (first technique) to using directional filters for locally adaptive spatial video noise reduction, in the context of luminance.

FIGS. 14–20 and accompanying text, hereinbelow, describe a second technique (adapted from and building upon the first technique) for locally adaptive spatial video noise reduction. Implemented for the Intel MMX instruction set, this second Directional Spatial Video Noise Reduction technique is applicable to both luminance and chrominance.

By pre-processing video to reduce entropy by attenuating spatial noise, trade-offs can be made between compression and smoothing artifacts. Locally adaptive directional low pass filtering as described in Jostschulte minimizes edge blurring, but provides no mechanism for adjusting the degree of smoothing. Such an adjustment mechanism is necessary to optimize image quality at a given bitrate.

The previous sections (FIGS. 1–13 and accompanying text) describe a technique for performing noise reduction for luminance only. The algorithm presented therein is based upon two independent parameters. The discussion hereinbelow with respect to FIGS. 14–20 includes chrominance smoothing as well, and describes a method for determining directionality based upon that of nearest luminance pixels for 4:2:0 video format. The number of smoothing parameters is reduced to one.

A Single Instruction Multiple Data (SIMI) implementation of locally adaptive directional filtering technique discussed hereinabove is described hereinbelow. Because the C software of the luminance smoothing discussed hereinabove utilizes integer arithmetic exclusively, adaptation to Intel's MMX instruction set is relatively straightforward. Without having to code in assembly, the implementation explained hereinbelow takes advantage of speed acceleration offered by parallel block processing through the use of MMX intrinsic instructions.

The description that follows, under the headings ("Luminance Spatial Decoding") and "Chrominance Spatial Denoising" details algorithm development and presents sample noise reduction results for the MMX implementation of luminance and chrominance, respectively. Under the heading "Algorithm Description" is presented a simplification to reduce the number of luminance denoising parameters from two to one. An algorithm for chrominance noise reduction with directionality based upon high-pass luminance filters is described under the heading "Chrominance algorithm implementation". The description, under the heading "Sample Chrominance Image Results", presents the results of chroma filtering alone in pseudo-color, along with smoothed true color images to show the combined effect of chroma and luma noise reduction.

Luminance Spatial Denoising

Given the extensive results for luminance-only denoising described hereinabove, an MMX implementation for directional luminance noise reduction is first described in this section. In the section entitled "Algorithm Description", processing is explained, giving an estimate of reduction in instructions required for the SIMD implementation, and discussing a simplification in low pass filter calculation that reduces the number of smoothing parameters from two to one.

Algorithm Description

FIG. 14 illustrates a set of high-pass filters for vertical, diagonal left, diagonal right and horizontal directions. Based upon this set of four 3×3 high-pass filters of unity gain, locally adaptive spatial denoising filters were previously calculated (according to the first technique, described above), one at a time, for each image pixel. In an effort to increase the processing speed and allow time for chrominance denoising or possible adaptation of smoothing parameter(s), an SIMD approach is now described using MMX intrinsic instructions for integer computations.

FIG. 15 illustrates MMX Registers for 8-byte blocks of pixel data from three successive image rows. Rather than using a 3×3 array of single pixels as previously described, directional smoothing filters for eight pixels can be calculated simultaneously using blocks of 64-bit registers from three successive image rows. FIG. 15 depicts such a block of three 64-bit registers (M1, M2, and M3), with each 64 bit register containing 8 bytes labeled in reverse alphabetical order (to reflect the "little endian" byte ordering of MMX registers, wherein bytes increase in significance from right to left). Bytes in a first register M1, are labeled H, G, F, E, D, C, B, and A from left to right and represent pixel values for an uppermost row (UP) of the block. Bytes in a first register M2, are labeled Q, P, O, N, M, L, K and J from left to right and represent pixel values for an middle row (MID) of the block. Bytes in a third register M3, are labeled Z, Y, X, W, V, U, T and S from left to right and represent pixel values for an bottommost row (DWN) of the block. For a byte offset index k=[0,7] (with "k" representing the horizontal position of the byte within the block) and vertical row position "i" (with "i" representing a vertical row offset within an image and "j" representing a horizontal eight-column block offset within an image), the upper (UP/M1), middle (MID/M2) and bottom (DWN/M3) rows shown represent pixels p(i−1, j+k), p(i,j+k) and p(i+1, j+k), respectively. Processing in row-major order, directional smoothing results for pixels p(i,j+k) are stored in place of p(i−1, j+k). By copying top and bottom rows and repeating the first column, all boundary pixels are filtered except for the last column, which is corrected to its unfiltered value. For an image of h rows by w columns, 8-byte blockwise pixel processing in this manner reduces the number of required instruction loops from h*w to h*w/8.

TABLE 4 gives a step-by-step summary of the MMX luminance denoising algorithm implementation, along with the number of instructions (#inst) executed in each loop. As explained below, in the section entitled "High Pass Directional Filters", processing steps 1 through 13 require a total of 74 byte-wise instructions for calculation of high-pass filters for smoothing direction determination. (Subtotals for steps 1–5, 6–10, 11–13 and 14–19 are shown in the column labeled "Tot #".) Processing steps 14 through 19 involve conversion to low-pass filters using a total of 38 byte-wise or word-wise instructions as described hereinbelow in the section entitled "Conversion to low-pass directional filters".

TABLE 4

MMX filtering for total of (112 * w * h/8) instructions for image of h rows and w columns

| Step | Functional Description of Processing | # inst | Tot # |
|---|---|---|---|
| 1 | Read new 8 byte blocks from rows (up, mid & down) & save old | 6 | 6 |
| 2 | Compute 8 averages of up and down row blocks | 1 | 5 |
| 3 | Determine 8 maxima and minima of mid and average | 2 | |
| 4 | Subtract min from max to give 8 high-pass absolute values | 1 | |
| 5 | Set 8 sign bytes to all 1's if mid = min, all 0's otherwise | 1 | |
| 6 | Shift up (left) and down (right) row blocks for left diagonal alignment | 8 | 39 |
| 7 | Shift up (right) and down (left) row blocks for right diagonal alignment | 8 | |
| 8 | Calculate left & right diagonal high-pass absolute values and signs | 10 | |
| 9 | Shift mid row left and right for horizontal alignment | 8 | |
| 10 | Calculate horizontal high-pass absolute values and signs | 5 | |
| 11 | Find 8 minimum absolute high-pass values and add offset | 4 | 24 |
| 12 | Zero high-pass values to exclude from 8 low-pass filters | 12 | |
| 13 | Zero signs for bytes with high-pass values equal 0 | 8 | |
| 14 | Complement negative high-pass values to give 1's complement | 4 | 38 |
| 15 | Count number of negative values to initialize filter sums | 5 | |
| 16 | Sum signed high-pass filters for upper 4 bytes | 9 | |
| 17 | Convert to low pass by subtracting 4 high-pass from 4 mid row pixels | 5 | |
| 18 | Compute low pass for lower 4 bytes | 14 | |
| 19 | Pack upper and lower bytes and store 8 smoothed pixels in up row | 1 | |

Step-by-step Summary of the MMX Luminance Denoising Algorithm Implementation

Step 1: Read new 8 byte blocks from rows (up, mid & down) and save old (see FIG. 15)

```
nxtup.q[0] = *(lum);                  //preload first 8 bytes of row 0
nxtmid.q[0] = *(lum+(n8cols));        //preload first 8 bytes of row 1
nxtdwn.q[0] = *(lum+(n8cols)*2);      //preload first 8 bytes of row 2
prvup.q[0] = nxtup.q[0];              //preload first 8 bytes of row i−1
prvmid.q[0] = nxtmid.q[0];            //preload first 8 bytes of row i
prvdwn.q[0] = nxtdwn.q[0];            //preload first 8 bytes of row i+1
```

As indicated by processing steps 2 through 5, absolute values |hp_filt(i,j+k, d) and signs for eight bytes are determined using five MMX intrinsic instructions:

FIG. 16 is a diagram illustrating byte-wise processing to compute eight vertical high-pass filter absolute values and signs. In FIG. 16, registers M1 and M3 (ref. FIG. 15) are shown with an arrow indicating that the pixels represented by the byte values (H–A) in M1 are vertically above the pixels represented by the byte values (Z–S) in M3. (Intervening row M2 representing pixel values (Q–J) not shown in FIG. 16). Results of the calculations described hereinbelow with respect to steps 2 and 3 are shown in registers labeled "AVERAGE", "MAXIMUM" and "MINIMUM". Results of the calculations described hereinbelow with respect to step 4 are shown in a register labeled "MAX-MIN". Results of the calculations described hereinbelow with respect to step 5 are shown in a register labeled "MID-MIN?" (the question mark indicates that the contents of the register are the result of a test).

Step 2: Compute 8 averages of up and down row blocks (See FIG. 16)

_m_pavg gives the rounded average of 8 bytes (p(i−1,j+k)+p(i+1,j+k))/2;

Step 3: Determine 8 maxima and minima of mid and average (See FIG. 16)

_m_pmaxub gives 8 maxima of these averages and central pixel values p(i,j+k);

_m_pminub gives 8 minima of averages and central pixel values;

Step 4: Subtract min from max to give 8 high-pass absolute values (See FIG. 16)

_m_psubusb subtracts minima from maxima to give 8 absolute values.

Step 5: Set 8 sign bytes to all 1's if mid=min, all 0's otherwise (See FIG. 16)

A single additional compare instruction _m_pcmpeqb) yields 8-bit signs for each byte, which are saved as a single 64-bit value.

Figure 17:
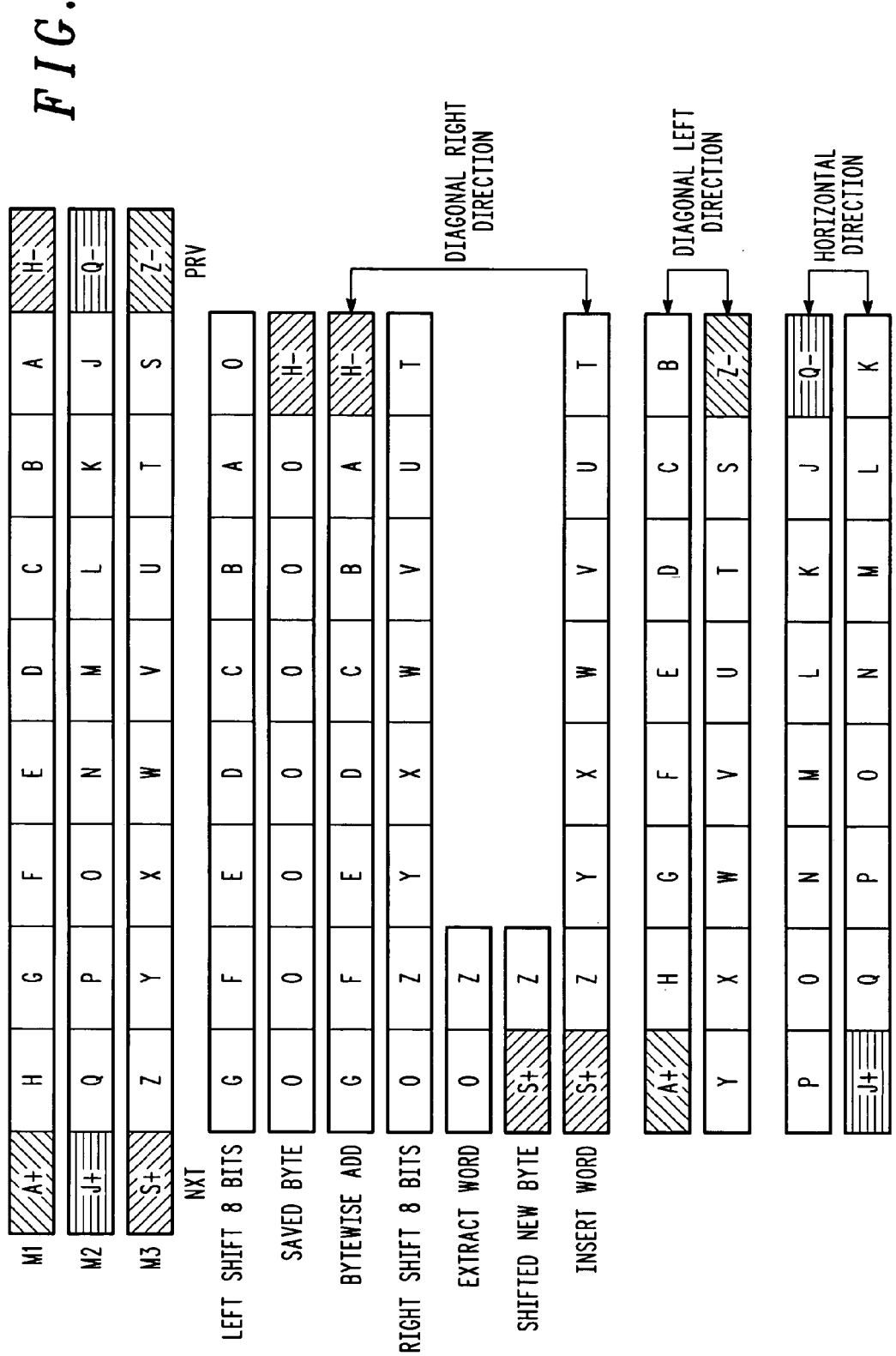
FIG. 17 is a diagram illustrating additional steps for alignment for diagonal and horizontal high-pass filters, according to the invention.

As indicated by processing steps 6, 7, and 9 , the left diagonal, right diagonal and horizontal filter directions require shifted alignment of the 8-byte blocks to be averaged. Bytes from the previous and subsequent 64-bit data blocks are needed in calculation of filters for end pixels. This is illustrated in FIG. 17, which show the aforementioned register block (M1, M2, M3). Left and right byte extensions (shaded) of the registers M1–M3 are shown in the Figure to indicate pixel values adjacent to those represented by the end bytes (A,H,J,Q,S,Z) of the registers M1–M3. An extension byte "A+" indicates the value of a pixel immediately to the left of the pixel represented by H, an extension byte "H−" indicates the value of a pixel immediately to the right of the pixel represented by A. Similarly, "J+" and "S+" represent pixels immediately to the left of Q and Z. respectively, and "Q–" and "Z–" represent pixels immediately to the right of J and S, respectively. Byte values and registers labeled "LEFT SHIFT 8 BITS", "SAVED BYTE", "BYTEWISE ADD", "RIGHT SHIFT 8 BITS", "EXTRACT WORD", "SHIFTED NEW BYTE", "INSERT WORD", "DIAGONAL RIGHT DIRECTION", "DIAGONAL LEFT DIRECTION", and "HORIZONTAL DIRECTION" represent the results of operations performed in steps described hereinbelow. Those of ordinary skill in the art will immediately understand the relationships between the register values, byte values, and MMX instruction processing as described hereinbelow. Note that the order of presentation and/or processing may differ slightly from that shown in TABLE 4. This is due, in part, to the nature of MMX instruction processing. Those of ordinary skill in the art will immediately understand that such subtle reordering is common when implementing algorithms, and that the reordering does not affect the integrity of the end result and yields a faithful implementation of the algorithm presented in table 4.

Step 7: Shift up (left) and down (right) row blocks for right diagonal alignment (See FIG. 17)

Right diagonal high-pass filter alignment of the upper row is performed by three MMX intrinsic instructions:
_m_psllqi shifts the 64-bit register left by 1 byte;
_m_from_int loads the saved last byte (k=7) from the previous block;
_m_paddusb adds the two to give the shifted block of 8 values, p(i−1, j+k−1) for k=[0,7].

Alignment of the bottom row of pixels for right diagonal averaging uses 3 additional MMX intrinsics:
_m_psrlqi performs a logical right shift of the 64-bit register by 1 byte;
_m_pextrw extracts the leftmost 16 bits from the result;
_m_pinsrw inserts the two-byte word including the first byte of the subsequent block to give the shifted block of values, p(i+1, j+k+1) for k=[0,7].

Two additional conventional C instructions complete the alignment
read subsequent block of 8 pixels and
add 256 times the first byte thereof (S+) to the extracted word (Z), Step 6: Shift up (left) and down (right) row blocks for left diagonal alignment (See FIG. 17)
Similar alignment of data blocks performed for left diagonal (p(i−1,j+k+1), p(i+1, j+k−1)) direction
repeat 8 instructions for left diagonal alignment Step 9: Shift mid row blocks left and right for horizontal alignment (See FIG. 17)
Similar alignment of data blocks performed for horizontal (p(i,j+k+1), p(i,j+k−1)) direction
repeat 8 instructions for of horizontal alignment Step 8: Calculate left & right diagonal high-pass absolute values and signs Step 10: Calculate horizontal high-pass absolute values and signs
execute steps 2.–5., above for left diagonal, right diagonal and horizontal using the same 5 MMX instructions as for vertical.

The final three processing steps for determination of filtering direction(s) from high-pass results (steps 11, 12 and 13) in are executed in 24 8-byte instructions.

Step 11: Find 8 minimum absolute high-pass values and add offset
The minimum absolute value of the four directions is easily determined for eight pixels simultaneously by applying the _m_pminub MMX intrinsic three times to give:

$|hp_{min}(i,j+k)|=\min_d(|hp\_filt(i,j+k,d)|)$ d=[1,4], k=[0,7]

Add a non-negative offset parameter (Δ) to each of the eight minima (_m_paddusb), Step 12: Zero high-pass values to exclude from 8 low-pass filters
high-pass filter directions with absolute values greater than $|hp_{min}(i,j+k)|$ plus Δ are identified (_m_pminub,_m_pcmpeqb) and set to zero (_m_pand). For use in chroma smoothing, a "dir-map" denoting which direction(s) to include in low-pass filtering for p(i,j+k) pixels is saved in a 64-bit array Step 13: Zero signs for bytes with high-pass values=0
For high-pass filter values equal to zero, sign bytes are set to zero using the MMX intrinsics for compare (_m_pcmpeqb) and bit-wise logical AND of negated high-pass values (_m_pandn).

In order to convert high-pass results to directional low-pass smoothing filters, unsigned absolute values must be converted to signed values.

Step 14: Complement negative high-pass values (1's complement)
Using the intrinsic instruction _m_pxor to perform an exclusive-or of non-negative high-pass absolute values with their appropriate sign bytes produces eight signed 1's complement hp_filt(i,j+k,d) values for each of the 4 directions, d=1 (vert), 2 (left), 3 (rght), 4 (horz).

Step 15: Count number of negative values to initialize filter sums
Rather than separately converting each of the four values to 2's complement, eight initialization values are computed in five MMX instructions by counting the number of negative high-pass values included in filter summation. Eight initialization values in the range [0,4] are calculated simultaneously by adding sign bytes with truncation (_m_paddb) for D=[1,4], complementing (_m_pxor) and incrementing negative results by adding eight bytes equal to one.

Step 16: Sum signed high-pas filters for upper 4 bytes
Unpacking the high-order bytes (_m_punpckhbw) of these initialization values with zeroes, and those of each directional high-pass filter with its respective sign, four 16-bit signed sums are computed in nine instructions (_m_paddw).

Step 17: Convert to low pass by subtracting 4 high-pass from 4 mid row pixels
Sums are subtracted (_m_psubsw) from weighted center pixels (p(i,j+k)<<2) for k=[4,7] to yield directional low-pass filters with a gain of 4. Adding four 16-bit words equal to 2 and right shifting each word by two bits gives rounded 8-bit outputs for four unity-gain low-pass filters.

Step 18: Compute low pass for lower 4 bytes
For the low-order bytes, unpacking (_m_punpcklbw), summing, subtracting and rounding operations produce like results for k=[0, 3].

Step 19: Pack upper and lower bytes and store 8 smoothed pixels in up row (see FIG. 18)
All eight smoothed luminance pixel bytes are re-packed (_m_packuswb) and stored in the 64-bit luminance image array in place of pixels p(i−1, j+k), k=[0,7].

Figure 18:
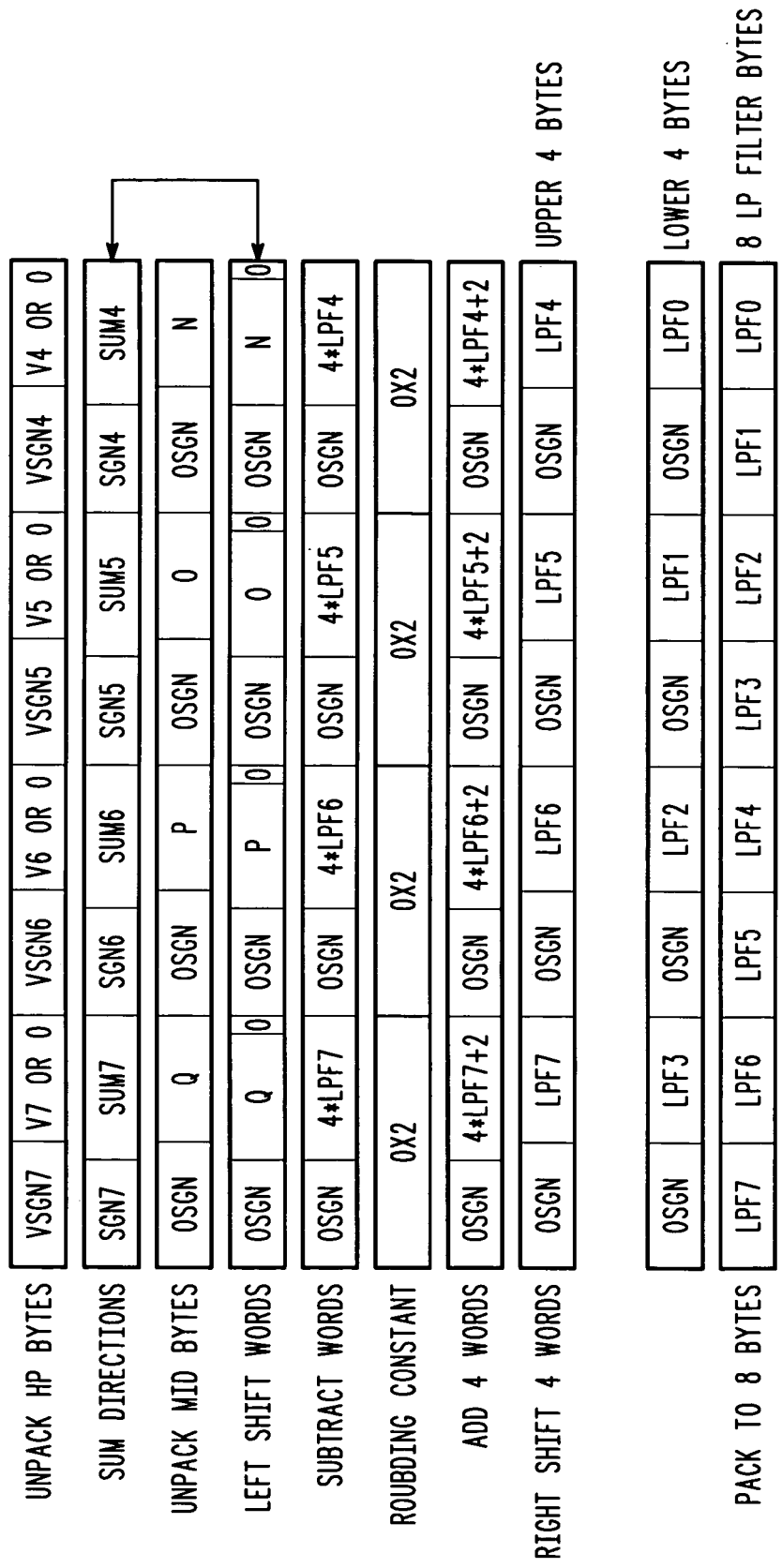
FIG. 18 is a diagram illustrating rounded low pass results for eight bytes, according to the invention.

FIG. 18 is a diagram illustrating rounded low pass results for eight bytes resulting from processing the intermediate results shown in FIG. 17 according to the processing steps hereinabove. Byte and register values labeled "UNPACK HP BYTES", "SUM DIRECTIONS", "UNPACK MID BYTES", "LEFT SHIFT WORDS", "SUBTRACT WORDS", ROUNDING CONSTANT", "ADD 4 WORDS", "RIGHT SHIFT 4 WORDS", "UPPER 4 BYTES", "LOWER 4 BYTES", "PACK TO 8 BYTES" and "8 LP FILTER BYTES" represents the results of operations described hereinabove with respect to steps 15–19.

High Pass Directional Filters

Attention is now directed again to FIG. 16, wherein byte-wise processing to compute eight vertical high-pass filter absolute values and signs is illustrated. Given the alignment of the pixel data shown in FIG. 15, the most straightforward filter direction to calculate is vertical. As illustrated in FIG. 16, scaled high-pass filters for aligned vertical direction (d=1) can be computed for eight contiguous pixels simultaneously:

$$hp\_filt(i,j+k,d)=p(i,j+k)-(p(i-1,j+k)+p(i+1,j+k))/2$$
$$k=[0,7] \qquad (eqn\ 7)$$

As indicated by processing steps 1 through 5 in TABLE 4, absolute values |hp-filt(i,j+k,d)| for k=[0,7] are determined using four MMX intrinsic instructions, as follows:

1. _m_pavg gives the rounded average of 8 bytes (p(i−1, j+k)+p(i+1, j+k))/2;
2. _m_pmaxub gives 8 maxima of these averages and central pixel values p(i,j+k);
3. _m_pminub gives 8 minima of averages and central pixel values;
4. _m_psubusb subtracts minima from maxima to give 8 absolute values.

A single additional compare instruction (_m_cmpeqb) yields 8-bit signs for each byte, which are saved as a single 64-bit value.

As previously described hereinabove, FIG. 17 illustrates additional steps for data alignment in the diagonal and horizontal high-pass filters (Shifts for Diagonal and Horizontal Filters). As indicated by processing steps 6, 7, and 9 in TABLE 4, the left diagonal (d=2), right diagonal (d=3) and horizontal (d=4) filter directions require shifting (scaling) to align the 8-byte data blocks to be averaged.

As illustrated by the patterned (cross-hatched, shaded) bytes in the top (as viewed) three rows of FIG. 17, bytes (H−, Q−, Z−) from the previous (prv-adjacent to the left in the sense of image space as described herein) and bytes (A+, J+, S+) from the subsequent (nxt—adjacent to the right in the sense of image space as described herein) 64-bit data blocks are needed in calculation of filters for end pixels, p(i,j) and p(i,j+7). (Note again that in MMX registers, bytes are ordered and loaded from right to left such that pixel data bytes loaded into MMX registers sequentially in left-to-right image order will appear in right-to-left byte order in the MMX register when the register is viewed with its most significant bits and bytes to the left. This is standard "little-endian" byte ordering practice used by most Intel processors and is well known to those of ordinary skill in the art).

As illustrated by the next seven rows in FIG. 17, right diagonal high-pass filter alignment of the upper row is performed by three MMX intrinsic instructions:

1. _m_psllqi shifts the 64-bit register left by 1 byte;
2. _m_from_int loads the saved last byte (k=7) from the previous block;
3. _m_paddusb adds the two to give the shifted block of 8 values, p(i−1, j+k−1) for k=[0,7].

Alignment of the bottom row of pixels for right diagonal averaging uses three additional MMX intrinsics:

4. _m_psrlqi performs a logical right shift of the 64-bit register by 1 byte;
5. _m_pextrw extracts the leftmost 16 bits from the result;
6. _m_insrw inserts the two-byte word including the first byte of the subsequent block to give the shifted block of values, p(i+1,j+k+1) for k=[0, 7].

Including two conventional C instructions to read the subsequent block of 8 pixels and add 256 times the first byte thereof (S+) to the extracted word (Z), a total of 8 instructions is needed for right diagonal alignment. As indicated by the pairs of blocks connected by arrows in FIG. 17, similar alignment of data blocks is performed for left diagonal (p(i−1,j+ k+1), p(i+1,j+k−1)) and horizontal (p(i,j+k+1), p(i,j+k−1)) directional filters as well. Once appropriately aligned, steps 8 and 10 in TABLE 4 reflect calculation of high-pass filters and signs for diagonal and horizontal directions (d=[2,4]) using the same set of 5 MMX instructions described above for the vertical direction (d=1).

The final three processing steps for determination of filtering direction(s) from high-pass results (TABLE 4, steps 11, 12 and 13) are executed in 24 8-byte instructions.

The minimum absolute value of the four directions is determined for eight pixels simultaneously by applying the _m_pminub MMX intrinsic three times to give:

$$|hp_{min}(i,j+k)|=\min_d(|hp\_filt(i,j+k,d)|)\ d=[1,4],\ k=[0,7] \qquad (eqn\ 8)$$

After adding a non-negative offset parameter (Δ) to each of the eight minima (_m_paddusb), high-pass filter directions with absolute values greater than |hp$_{min}$(i,j+k)| plus Δ are identified (_m_pminub, _m_pcmpeqb ) and set to zero (_m_pand). For use in chroma smoothing described in the section entitled "Chrominance Spatial Denoising" (below), a "dir-map" denoting which direction(s) to include in low-pass filtering for p(i,j+k) pixels is saved in a 64-bit array. For high-pass filter values equal to zero, sign bytes are set to zero using the MMX intrinsics for compare (_m_pcmpeqb) and bit-wise logical AND of negated high-pass values (_m_pandn).

Conversion to Low-pass Directional Filters

In order to convert high-pass results to directional low-pass smoothing filters, unsigned absolute values must be converted to signed values. Using the intrinsic instruction _m_pxor to perform an exclusive-or of non-negative high-pass absolute values with their appropriate sign bytes produces eight signed 1's complement hp_d(i,j+k) values for each of the 4 directions, d=1 (vert), 2 (left), 3 (rght), 4 (horz). Rather than separately converting each of the four values to 2's complement, eight initialization values are computed in five MMX instructions by counting the number of negative high-pass values included in filter summation. Eight initialization values in the range [0,4] are calculated simultaneously by adding sign bytes with truncation (_m_pddb) for D=[1.4], complementing (_m_pxor) and incrementing negative results by adding eight bytes equal to one.

FIG. 18 illustrates the set of instructions used to calculate rounded low pass results for eight bytes. Unpacking the high-order bytes (_m_punpckhbw) of these initialization values with zeroes, and those of each directional high-pass filter with its respective sign, four 16-bit signed sums are computed in nine instructions (_m_paddw). These sums are subtracted (_m_p subsw) from weighted center pixels (p(i,j+k)<<2) for k=[4,7] to yield directional low-pass filters with a gain of 4. Adding four 16-bit words equal to 2 and right shifting each word by two bits gives rounded 8-bit outputs for four unity-gain low-pass filters. For the low-order bytes, unpacking (_m_punpcklbw), summing, subtracting and rounding operations produce like results for k=[0,3]. As shown at the bottom of FIG. 18, all eight smoothed luminance pixel bytes are re-packed (_m_packuswb) and stored in the 64-bit luminance image array in place of pixels p(i−1,j+k), k=[0,7].

Ignoring rounding, the MMX procedure described above gives a low-pass filter in accordance with:

$$\text{lp\_MMX}(i, j+k) = \left[4 \cdot p(i, j+k) - \sum_{d=1}^{D} \text{hp\_filt}(i, j+k, d)\right] >> 2 \quad \text{(eqn 9)}$$

$$k = [0, 7]$$

Equation 6 (eqn 6), from above, is as follows:

$$\text{lp\_filt}(i, j) = \left[256 \cdot p(i, j) - w(\alpha, D) \sum_{d=1}^{D} \text{hp\_filt}(i, j, d)\right] >> 8 \quad \text{(eqn 6)}$$

Comparing equation 9 to equation 6, it can be noted that the MMX algorithm implementation has no independent center pixel weighting parameter, and the degree of smoothing is determined solely by the number of directions that have high-pass absolute values less than or equal to $|\text{hp}_{min}(i,j+k)+\Delta|$.

Figures 19, 20:
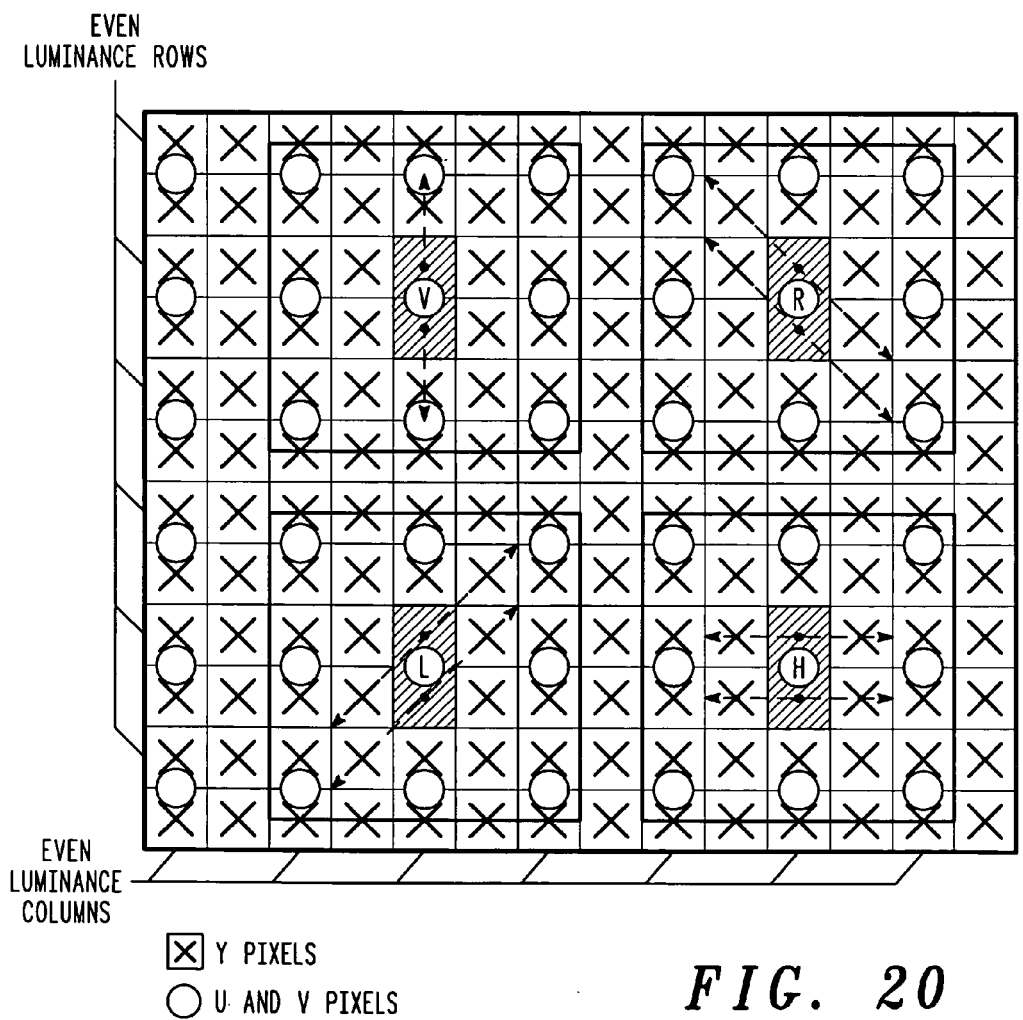
FIG. 19 is a diagram illustrating high-pass sums (top) and low-pass filters (bottom) for number of directions D=[1,4], according to the invention.
FIG. 20 is a diagram illustrating low-pass chroma filtering based upon directionality from 2 nearest luminance pixels, according to the invention.

FIG. 19 illustrates high-pass sums (top) and low-pass filters (bottom) for a number of directions D=[1,4]. Presenting examples of high-pass sums and resultant low-pass filters for equations (eqn 7) and (eqn 9) above, the lower rows in FIG. 19 show that non-central pixels have a constant weighting of ⅛, and center pixel weighting decreases from 75% for a single direction (D=1), to 50% for D=2, 25% for D=3, and zero for quad-directional (D=4) low-pass filters.

This approach has the advantage of simplicity, both in terms of the implementation as well as control of the degree of low-pass filtering determined by a single parameter.

For better insight into of the operation of luminance directional smoothing, pseudo-images can be used to illustrate the direction(s) of spatial low-pass filters. Based upon the approach described in C. Anderson, "DSM02/134, *Directional image smoothing by direct low-pass filtering*", Nov. 14, 2002, a numeric mapping gives unique values to all possible combinations of directions for D=[1,4] by assigning the values 5, 6, 7 and 9 to vertical (V), diagonal left (L), diagonal right (R) and horizontal (H) filters, respectively. Summing these values for all directions included in the multi-directional low-pass weighted average for each pixel gives unique values for all filter combinations. D=1 is for four uni-directional filters. D=2 is for six bi-directional filters. D=3 is four tri-directional filters. D=4 is for a single quad-directional filter. The results are shown in TABLE 5.

TABLE 5

Numeric mapping for directional averaging
D = 1 (5–7, 9) D = 2 (11–16), D = 3 (18, 20–22), D = 4 (27)

| D = 1 | | | | D = 2 | | | | | | D = 3 | | | | D = 4 |
|---|---|---|---|---|---|---|---|---|---|---|---|---|---|---|
| 5 | 6 | 7 | 9 | 11 | 12 | 13 | 14 | 15 | 16 | 18 | 20 | 21 | 22 | 27 |
| V | | | | V | V | | V | | | V | V | V | | V |
| | L | | | L | | L | | L | | L | L | | L | L |
| | | R | | | R | R | | | R | R | | R | R | R |
| | | | H | | | | H | H | H | | H | H | H | H |

Chromance Spatial Denoising

Having demonstrated the effectiveness of an MMX implementation of locally adaptive directional low-pass filtering in luminance noise reduction, a similar method is now described for chrominance smoothing.

Chrominance Algorithm Implementation

FIG. 20 illustrates low-pass chroma filtering based upon directionality from 2 nearest luminance pixels. While the luminance smoothing algorithm described hereinabove could be applied to chrominance pixels as well, high-pass filtering need not be performed a second or third time if chrominance direction(s) are determined from local luminance results. Representing y (luminance) pixels by squares with Xs in them, and u and v (chrominance) pixels by circles, FIG. 20 shows the positions of chroma (chrominance) pixels for 4:2:0 to be horizontally aligned with luma (luminance) pixels in even columns and positioned between even and odd luma rows. FIG. 20 also illustrates how chroma low-pass filtering can be performed vertically (V), diagonally (R,L) and/or horizontally (H) based upon smoothing direction(s) of the immediate luminance neighbors denoted by the shaded squares.

Although the 5,6,7,9 numeric mapping of the four directions described hereinabove in TABLE 5 is useful for display, a four-bit representation is preferably chosen for processing. As shown in the numeric mapping table (Table 6) below, the 15 filter combinations are mapped by setting bits to one for direction(s) to be included in the local low-pass filter—the least significant bit for vertical, the next two for left and right diagonal, and the most significant bit for horizontal. Using this bit-wise representation suggests two simple possibilities for setting direction(s) for each chroma pixel by logical combination of directional bit patterns of the nearest luma neighbors with either "or" or "and" operations.

TABLE 6

Numeric mapping using 4-bit values in the range [1, 15]

| D = 1 bit patterns | | | | D = 2 | | | | | | D = 3 | | | | D = 4 |
|---|---|---|---|---|---|---|---|---|---|---|---|---|---|---|
| 0001 | 0010 | 0100 | 1000 | 0011 | 0101 | 0110 | 1001 | 1010 | 1100 | 0111 | 1011 | 1101 | 1110 | 1111 |
| V | | | | V | V | | V | | | V | V | V | | V |
| | L | | | L | | L | | L | | L | L | | L | L |
| | | R | | | R | R | | | R | R | | R | R | R |
| | | | H | | | | H | H | H | | H | H | H | H |

Denoting this logical operation as "OR_AND", each of eight directional chrominance bit patterns $b_{uv}(i,j,k)$ is determined from four luminance directional bit patterns $b_y(2i,2j+k)$, $b_y(2i+1,2j+k)$, $b_y(2i,2j+1+k)$ and $b_y(2i+1,2j+1+k)$ in accordance with the following equation:

$$b_{uv}(i, j+k) = \begin{cases} \text{OR\_AND}[b_y(2i, 2j+k), by(2i+1, 2j+k)] & k = 0, 2, 4, 6 \\ \text{OR\_AND}[b_y(2i, 2j+1+k), by(2i+1, 2j+1+k)] & k = 1, 3, 5, 7 \end{cases} \quad \text{(eqn 10)}$$

Utilizing MMX intrinsic instructions (_m_pand, (_m_pcmpeqb, (_m_packuswb) together with those for loading the four luminance directions, eight $b_{uv}(i,j+k)$ values are calculated in 8 instructions. To determine whether or not a given direction is to be included in the low-pass filter, each of the resultant $b_{uv}(i,j+k)$ bytes is masked by 4 bits of zero followed by the shaded 4-bit patterns for D=1 in Table 6. Loading and applying 64-bit masks for each direction and saving the results requires an additional 20 instruction cycles.

Center pixel weighting for eight $p_{uv}(i,j+k)$ chrominance pixels is calculated in 6 instructions for each chroma component. The number of directions is summed (_m_paddb), complemented (_m_pxor), and incremented by adding eight byes, each equal to one, to give the value of D. Subtracting this sum from 4 (_m_psubusb) gives eight non-negative center weighting factors $w_{uv}(i,j+k)$ in the range of either [0,3] or [0,4] for logical luminance combination by "or" or "and", respectively. The low-pass filter applied to chrominance pixels $p_{uv}(i,j+k)$ is given by:

$$lp\_MMX(i, j+k) = \left[ (w_{uv}(i, j+k) \cdot p_{uv}(i, j+k) + \sum_{d=0}^{D} [p_{uv}(i-\delta_i, j-\delta_j+k) + p_{uv}(i+\delta_i, j+\delta_j+k)]/2 \right] >> 2 \quad k = [0, 7] \quad \text{(eqn 11)}$$

where row and column deltas for the four directions are given by:

| | | |
|---|---|---|
| δi = 1 | δj = 0 | vertical |
| δi = 1 | δj = −1 | left diagonal |
| δi = 1 | δj = 1 | right diagonal |
| δi = 0 | δj = 1 | horizontal |

As previously described for luminance pixels, the eight rounded averages of non-central pixels summed in (eqn 11) are calculated by the _m_pavg MMX intrinsic, and alignment of blocks for non-vertical filters ($*_{j?}0$) is performed using the method illustrated in FIG. 17. While chrominance masks for the 2nd chroma component need only be read, application of these masks, processing steps [1,2,6,7,9] listed in TABLE 4 and word-wise computations of (eqn 11), repacking and storing the final rounded low-pass result must be performed for both u and v.

For the 8-byte MMX implementation, a total of 97 and 73 inner-loop instructions are required for u and v, respectively. Comparing (150*w*h/32) instructions for chrominance filtering to the (112*w*h/8) from TABLE 4, chrominance smoothing is expected to add about ⅓ to the execution time for MMX denoising of luminance alone.

Processing Speed Improvement

The average elapsed time and relative processing time for processing 180 frames of a high-definition (1280×720) 4:2:0 progressive sequence was measured, and the following speed improvement attained by the MMX-implementation was demonstrated, for each of three cases, with the following results.

| Case # | Description | CPU usage Average | relative elapsed time | relative CPU time |
|---|---|---|---|---|
| 1 | C Luma | 61% | 100% | 100% |
| 2 | MMX yuv | 20% | 74% | 24% |
| 3 | MMX Luma | 24% | 39% | 15% |

As shown in column 4 (relative elapsed time), relative to luminance filtering alone for standard C coding (Case 1), luminance and chrominance smoothing with MMX (Case 2) can be performed in less than ¾ of the time, and luminance alone (Case 3) in less than 40%. If the varying CPU usage averages noted in column 2 (CPU usage average) are taken into account, the improvement shown in column 5 (relative CPU time) is even more dramatic—more that 6½ times the speed for luminance alone and more than 4 times faster for noise reduction of luminance and chrominance combined.

Having described both luminance and chrominance denoising algorithms and presented sample results in the previous two sections, relative processing speed is determined from elapsed time for executing the n frames for a given video sequence by simply subtracting the end time from the start time. (startime=clock ( ); totaltime=clock( )−startime) . is determined Running the code in DOS under Windows 2000, processing time so measured is highly variable due to dramatic changes in CPU utilization.

To minimize the variability in processing speed measurements, processing time is measured for 1000 iterations for each frame. This looping and disregarding time for i/o operations, total CPU loading was nearly 100% for both standard C and MMX implementations, and confidence ranges for average processing time measurements were well separated. Relative to that for luminance filtering in standard C, processing time per luminance frame was reduced by almost 90% for the 8-byte MMX implementation.

Modified Directional Spatial Noise Reduction And Alternate Mmx Implementation

As described hereinabove, a directional denoising technique smoothes noisy images without blurring detail by using high pass filters to identify local edge direction and applying low pass filtering only along object boundaries and in unstructured areas. Below, a technique for increasing the extent of locally adaptive low pass smoothing filters from 3×3 to 5×5 pixel neighborhoods is described.

Algorithmic modifications for a 5×5 local neighborhood are discussed below, under the heading "Spatial Denoising For Extended Neighborhood". The set of eight directional high-pass filters designed for this larger neighborhood include: a) Simple extensions of horizontal and vertical directions, b) Extensions of diagonals with modification to include small contribution from off-diagonal pixels outside the 3×3 array, and c) Introduction of four new directions passing through the center pixel at angles between those at integer multiples of 45°.

The eight high pass filters described below for the 5×5 extended neighborhood can be used either stand-alone or in combination with in 3×3 processing to help distinguish between isolated high pass noise pixels and more extended image edges. Designed to facilitate 5×5 filtering, a 4-byte MMX implementation is explained in detail hereinbelow under the heading "Luminance Spatial Denoising For 4-Byte MMX Implementation" for the 3×3 neighborhood.

Spatial Denoising For Extended Neighborhood

In order to determine local edges of greater extent that previously described, directionality determination can be based on not only eight adjacent pixels, but also on sixteen additional neighbors immediately surrounding the 3×3 array. FIG. 21 shows the vertical, horizontal and diagonal filter directions for a 3×3 neighborhood (left), along with extension of these to a 5×5 pixel array (middle) and four additional directions between the integer multiples of 45° (right). First considering the middle characterization of 5×5 directionality in this figure, the following paragraphs describe a way to use all 25 of the pixels in the extended neighborhood to define high pass filtering in only horizontal, vertical and diagonal directions.

FIG. 22 shows coefficient value positions (relative to a center pixel of interest) for horizontal (H), vertical (V), and diagonal filters in the leftward (DL) and rightward (DR) directions. The first two (H, V) are simply extended horizontally and vertically, respectively, from the 3×3 high pass filters described hereinabove, while the second two (DL, DR) are not only extended along the diagonal, but also use additional pixels in the larger 5×5 neighborhood. Multiplying the mid pixel by +2 gives a zero mean filter in each of the four cases with a center weighting of 50%. In the interest of computational speed and simplicity, high pass coefficients are all chosen to be powers of two (for simple calculation in integer arithmetic without division).

FIG. 23 shows a coefficient usage map (left) and coefficient values (right) for the 5×5 neighborhood. A center pixel of interest, designated in the figure as MID, represents a reference image pixel position. All coefficient values are determined by their position relative to MID (i.e., the filter is convolutional in nature) and each coefficient position (other than MID) is used in exactly one of four directional filters as shown in FIG. 22. Similarly, as noted by the pixel usage map given on the left-hand side of FIG. 23, all 24 neighbor pixels (other than "MID") in the 5×5 array are utilized for exactly one of the four directional filters (H, V, DL, DR). The 12 coefficient positions closest to the center (radial distance<=2) have higher absolute coefficient values. One slight disadvantage of the 4-directional approach is that although the four corner coefficient positions are located at a radial distance greater than that of the eight along the outer edges at horizontal and vertical separation of (1,2) or (2,1), they are more strongly weighted (¼ for the corner positions as opposed to ⅛ for their neighbors along the outside edge).

The most serious limitation of a 4-directional characterization for a 5×5 pixel array is that local edges are unlikely to be confined to integer multiples of 45° across the extended neighborhood. For this reason, additional high pass filters are designed for four additional directions that pass through the center pixel as shown in FIG. 21 (in the rightmost representation illustrating four additional filter directions between the 45 degree positions.) For these additional directions, as well as the horizontal, vertical and diagonals, a summary of descriptive filter names and angles is listed in tabular form in FIG. 24.

The rightmost two columns in the table of FIG. 24 show horizontal and vertical distances or offsets (Δx1, Δy1) and (Δx2, Δy2) of primary and secondary pixel neighbors from the central pixel position (MID), respectively. Note that while the end points in the final column are integer multiples of pixel spacing for all eight high pass filters, the four additional directions each pass exactly halfway between two primary pixel neighbors in the 3×3 array. For these "Lesser angle" (±27°) and "Greater angle" (±63°) filters, values for these "halfway" positions (represented by circles in FIG. 21) can be calculated from the average of the two primary neighbor pixels on either side of the "halfway" position.

The equal weighting (averaging) of these primary pixel pairs is reflected in the coefficient values for the four additional filter directions shown in FIG. 25. Both leftward and rightward Lesser-angle (LL, LR) and Greater-angle (GL, GR) high pass filters exhibit monotonic decreases in coefficient absolute value with increasing distance from the center (MID/reference position). Again multiplying the mid pixel by +2 gives a zero-mean filter in each case with a center weighting of 50%. Like H, V, DL and DR filters in FIG. 22, these new filters can be easily calculated using integer arithmetic without division, since the denominator of all coefficient values is a power of two.

FIG. 26 shows a pixel usage map (left) and corresponding coefficient value map (right) for the extended 5×5 neighborhood surrounding MID (the reference pixel of interest). As highlighted in the pixel usage map, the pixels in the central 3×3 array (other than MID) are utilized for three different high pass filters, the eight at a distance of $\sqrt{5}$ (|Δx2|,|Δy2|=1,2 or 2,1) for two directions, and remaining eight pixels (corners, top/bottom/left/right centers) for only a single direction. Coefficients for all high pass filter directions added together are listed in their corresponding positions in the right half of the figure. For the five radial distances (1, $\sqrt{2}$, 2, $\sqrt{5}$, $\sqrt{8}$) from the mid pixel, relative weighting as a function of spatial separation decreases monotonically (10, 10, 4, 3, 2).

The full set of eight simple high pass directional filters for the extended 5×5 neighborhood are represented by three distinct types: 1) horizontal and vertical filters, 2) diagonal filters, and 3) lesser and greater angle filters. In terms of coefficient magnitudes (absolute values) with respect to spatial distance from the center (MID), all filters of any of the three given types behave in the same way, and all filters of all three types are monotonically decreasing with increasing distance.

Figure 27:
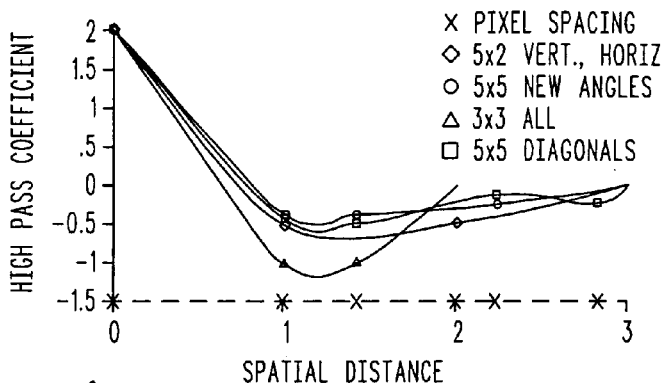
FIG. 27 is a diagram illustrating impulse responses for a zero-mean high pass directional spatial filters in a 5×5 neighborhood, according to the invention.

FIG. 27 is a plot of high-pass coefficient values versus spatial distance from the center (MID) for the three filter distinct types: horizontal/vertical (5×2 VERT/HORIZ), diagonal (5×5 DIAGONALS), and lesser/greater angle (5×5 NEW ANGLES). Coefficients for the 3×3 filters described previously (3×3 ALL) are provided for reference and comparison. While the impulse response of these discrete filters is only defined at five discrete distances (1, $\sqrt{2}$, 2, $\sqrt{5}$ and $\sqrt{8}$ pixel distances from the mid pixel), smooth curves connecting the discrete coefficient values are used to assist in envisioning similarity between and circular symmetry of the three types. Compared to the coefficients of the 3×3 high pass filter (scaled to the coefficient values (2, −1, −1)), the wider extent of the 5×5 filters (filled symbols) is readily apparent. The 3×3 coefficients are only defined for distances less than or equal to $\sqrt{2}$.

Figure 28:
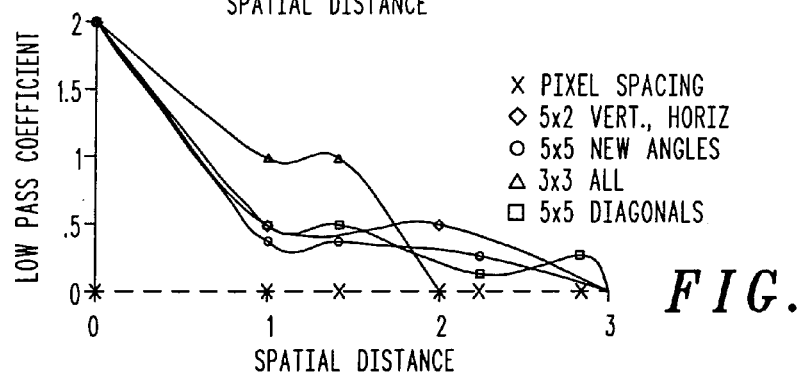
FIG. 28 is a diagram illustrating impulse response for scaled low pass directional spatial filter with gain=4 in a 5×5 neighborhood, according to the invention.

FIG. 28 shows scaled (gain 4) low pass filter impulse responses (coefficients) for each of the three types of directional 5×5 high-pass filters (horizontal/vertical, diagonal, and greater/lesser angle, similar to those shown in FIG. 27 for high pass filter coefficients), and for the scaled 3×3 filter (defined only for distances<=$\sqrt{2}$). Unity-gain low pass filters with 50% center weighting in a single direction "d" are readily computed from high pass filters:

$$lp\_\text{filt}(i,j,d)=p(i,j)-(hp\_\text{filt}(i,j,d))/4 \qquad \text{(eqn. 12)}$$

As described hereinabove, multi-directional low pass filtering is performed in D directions by averaging all directions ($d_m$) with high pass absolute values less than the minimum plus offset:

$$\text{lp\_filt}(i, j) = p(i, j) - \sum_{m=1}^{D} (\text{hp\_filt}(i, j, d_m))/4D \quad \text{(eqn. 13)}$$

For each of the eight possible values of D, the number of different low pass filter configurations is $$\binom{8}{D},$$

many of which are different rotations or mirror images of the same basic filter shape. As shown by the expression below, there are 255 different low pass combinations for the eight 5×5 filter directions.

$$\sum_{D=1}^{8} \binom{8}{D} = 255 \quad \text{(eqn 14)}$$

The number of low pass filters configurations and number of unique low pass shapes for each value of D=[1,8] is given in the table below:

| D directions | Number of filter configurations | Number of unique shapes |
|---|---|---|
| 1 | 8 | 3 |
| 2 | 28 | 10 |
| 3 | 56 | 17 |
| 4 | 70 | 22 |
| 5 | 56 | 17 |
| 6 | 28 | 10 |
| 7 | 8 | 3 |
| 8 | 1 | 1 |
| Total | 255 | 83 |

New Figure illustrates scaled 5×5 high-pass sums shown above corresponding low-pass filters for a number of directions D=[1,4] (top) and D=[5,8] (bottom). These examples of high-pass sums and resultant low-pass filters shows that low pass center pixel weighting decreases from ⅞ for a single direction (D=1), to ¾ for D=2, ⅝ for D=3, to ½ for D=4, to ⅜ for D=5, to ¼ for D=6, to ⅛ for D=7 and zero for quad-directional (D=4) low-pass filters using the expression:

$$\text{lp\_filt}(i, j) = \left[ 8 \cdot p(i, j) - \sum_{d=1}^{D} \text{hp\_filt}(i, j, d) \right] \gg 3$$

Figure 29:
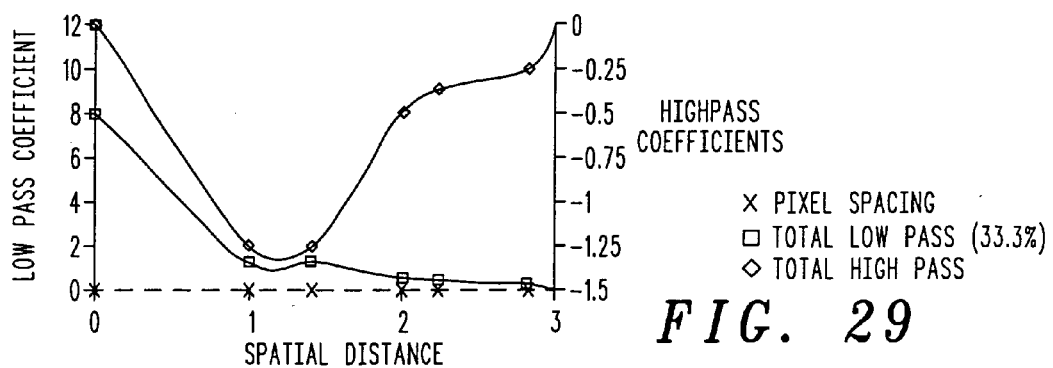
FIG. 29 is a diagram illustrating impulse responses for an eight-direction (D=8) low pass and high pass directional spatial filters in a 5×5 neighborhood, according to the invention.
Figure 30:
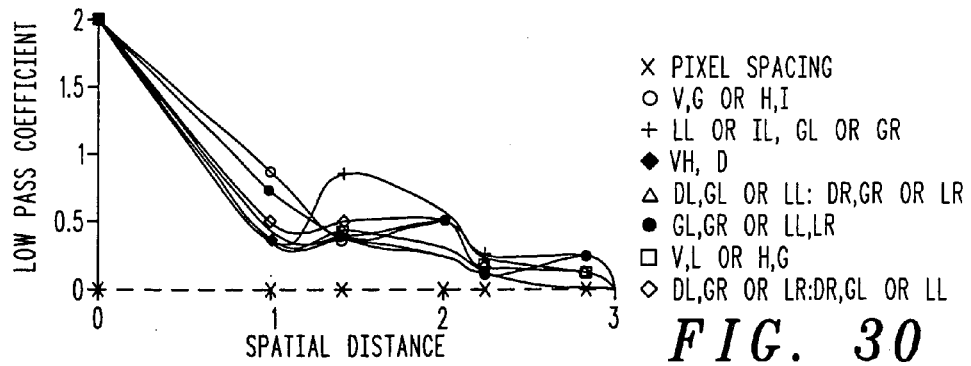
FIG. 30 is a diagram illustrating impulse response for a two-direction (D=2) low pass directional spatial filter in a 5×5 neighborhood, according to the invention.

Examples of the impulse response shapes of multi-directional filters using combinations of eight 5×5 filters are given in FIGS. 29 and 30. In FIG. 29, the overall high pass and low pass coefficient values of all the filters summed together (previously listed in FIG. 26) are plotted as functions of spatial distance from the MID pixel. The high pass impulse response is plotted against the right-hand scale (ranging from −1.5 to 0—while the total high pass coefficient for the mid pixel is 16, it is shown as zero to emphasize the monotonic decrease in weighting of neighboring pixels.) The low pass impulse response for D=8 is plotted against the left-hand scale in FIG. 29. For this example, the adjustable center pixel weighting (discussed above) compared to the total of all 25 low pass coefficients is set to ⅓.

FIG. 30 is a graph of low pass impulse responses (filter coefficients) for all shapes of filter pairs with center weighting of ⅓, plotted as a function of spatial distance from the MID pixel. Note that for D=2, weights do not decrease monotonically with spatial distance, particularly when filter pairs are in leftward (DL and LL or GL) or rightward directions (DR and LR or GR).

Efficient MMX implementation of the present inventive technique for the 5×5 local neighborhood benefits by simplifying the alignment process described previously for inclusion of additional pixels at a spatial separation of two from the center. Such a simplification is described hereinbelow.

Figures 31, 32, 33:
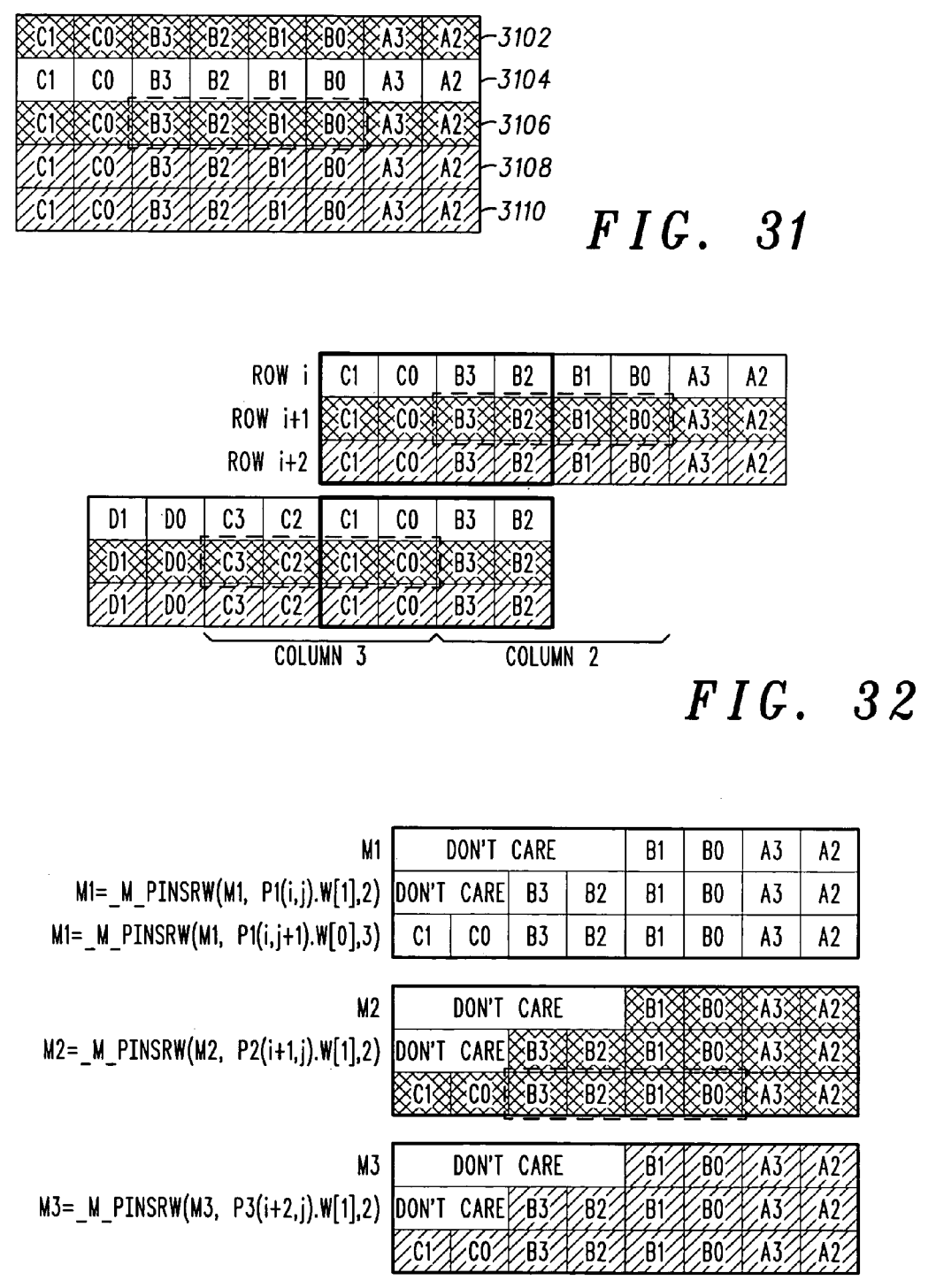

FIG. 31 is a diagram illustrating data organization for simultaneous processing of four pixels using five 64-bit MMX registers (3102, 3104, 3106, 3108 and 3110, from top to bottom as viewed in the Figure). As before, each MMX register 31xx is organized as a group (block) of eight 8-bit bytes. As depicted in FIG. 31, directional high-pass filters for the extended neighborhood can be accomplished for four pixels simultaneously by organizing memory as 32-bit long double words (A0–A3, B0–B3, C0–C3, etc.), and loading 64-bit MMX registers from 5 successive rows with four bytes (B0–B3) for a given double-word column in the center, preceded by the last two bytes from the previous column (A2,A3) and followed by the first two from the subsequent column (C0,C1). (As noted hereinabove, MMX registers employ "little-endian" conventions and are loaded from right to left. Processing for the first double word in each row can be accomplished by repeating the first byte twice to give [B1,B0, A3,A2,A1,A0,A0,A0].) As shown in the Figure, each register (31xx) represents 8 adjacent pixel values. The registers (31xx) are loaded from top to bottom (as viewed) with pixel values from 5 successive rows of pixels such that taken in combination, the registers 3102–3110 represent a 5-high by 8-wide block of pixel values corresponding to a 5×8 block of image pixels. The designations A0, A1, A2, A3, B0, B1 in each register (as depicted) refer to column positions. Accordingly, the pixel value A0 in register 3102 corresponds to an image pixel in the same horizontal column position as the pixel value A0 in register 3104 but in a row immediately thereabove. Similarly, pixel values in register 3106 correspond to image pixels in a row immediately below those represented by pixel values in register 3104, etc..

Since 5×5 neighborhood processing requires 25 pixels values in a 5×5 array surrounding a reference pixel, this arrangement of pixel values in five MMX registers (31xx) permits 5×5 spatial filtering of five horizontally adjacent pixel values at once. For pixel values in register 3106, there are pixel values in the remaining four registers (3102, 3104, 3108 and 3110) associated with pixels for two rows above and for two rows below. Allowing for two pixel values to the left and two pixel values to the right, this means that 5×5 neighborhood spatial filtering can be performed on pixel values B3, B2, B1 and B0 in register 3106 without retrieving any additional pixel value information.

Compared to the 8-byte implementation described hereinabove for 3×3 neighborhoods, which required eight instructions for the alignment of each non-vertical high pass filter, this 4-byte approach simplifies alignment to facilitate extension to the 5×5 neighborhood, which has seven non-vertical filters.

Luminance Spatial Denoising For 4-Byte MMX Implementation

For an image of h rows by w columns, 4-byte block-wise processing reduces the number of instruction loops from h*w to h*w/4. While this would imply that 4-byte processing would only have half the speed advantages of the 8-byte implementation described previously for 3×3 neighborhoods, the procedure described below for 5×5 neighborhoods calculates two 4-byte filters at a time to mitigate speed loss.

Column Advance

Directional smoothing filters for four pixels can be calculated simultaneously using 64-bit registers from three successive image rows. For a byte offset index k=[0,3], the pixels outlined with the dotted lines (B0, B1, B2 and B3) in FIG. 32 are filtered using upper (i), middle (i+1) and bottom (i+2) rows shown. Processing in row-major order, directional smoothing results for the middle row of pixels p(i+1, j+k) are stored in place of p(i,j+k).

At the start of each new 4-byte column block, the four unfiltered pixel values for rows i,i+1 and i+2 saved from the previous column are contained in the lower four bytes of each three MMX registers m1, m2 and m3. As illustrated in FIG. 33, MMX intrinsic instructions for insertion of 2 words into the upper four bytes of each of these registers requires a total of 6 instructions. FIG. 33 shows the association between register contents (at right) and execution of the MMX intrinsic instructions (shown in mnemonic form at left).

Figures 34, 35, 36:
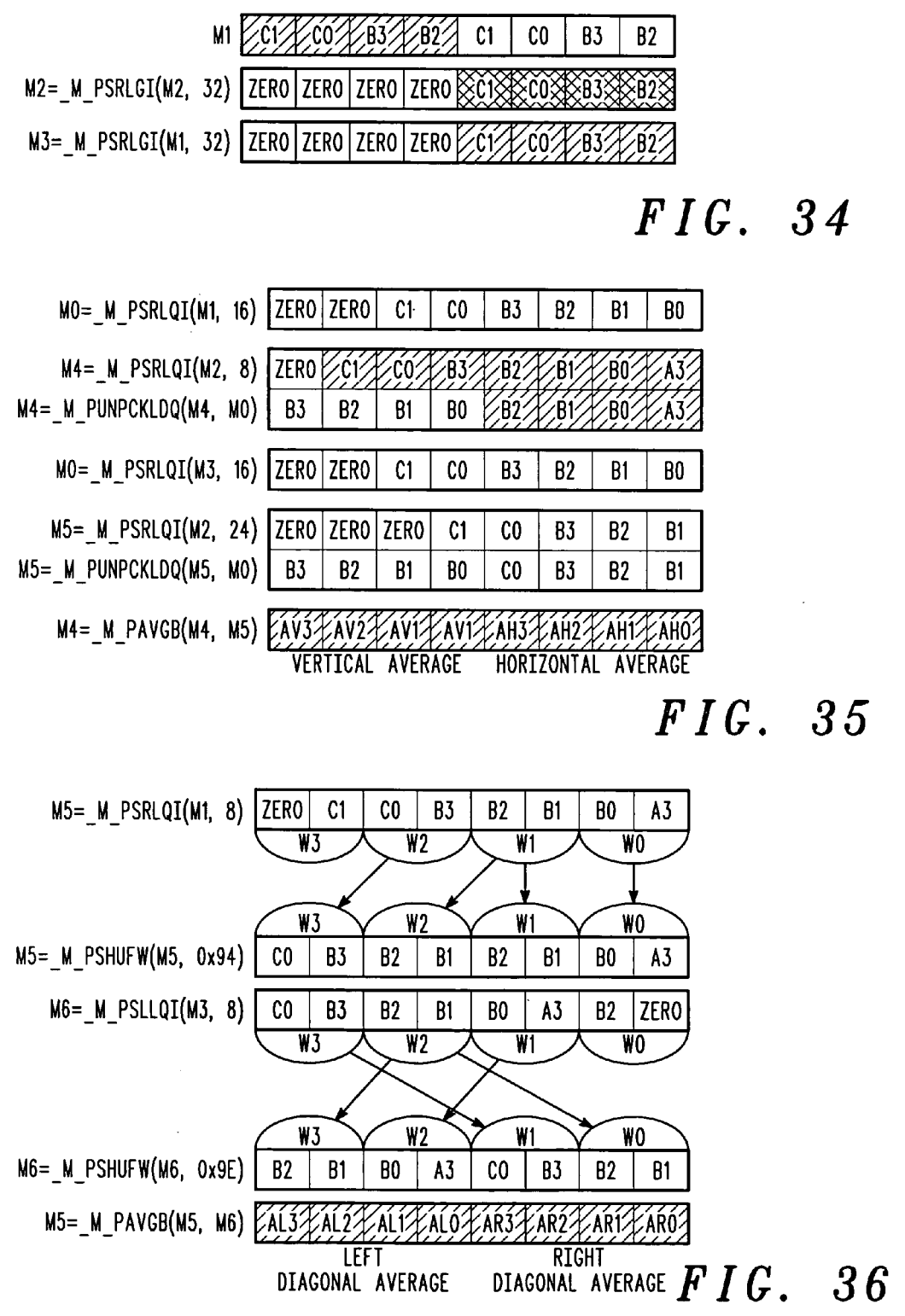

Following the processing for smoothing four bytes described in the following subsections, source pixels to be re-used for the middle row (i+1) are contained in the upper four bytes of m2, while those for rows i and i+2 are contained in the lower and upper four bytes of m1, respectively. As shown in FIG. 34, only two 'shift' instructions are required to move saved data into the lower four bytes of each of the three MMX registers. FIG. 34 shows the association between register contents (at right) and execution of MMX shift instructions (at left).

Filter Alignment and Computation of Averages

With a few simple alignment steps, two 4-byte high pass filters can be calculated simultaneously. As illustrated in FIG. 33, only six instructions are required to compute averages of rows i and i+2 for aligned horizontal and vertical directions in the low and high bytes of m4, respectively. FIG. 35 shows the association between register contents (at right) and execution of MMX instructions (at left).

FIG. 36 shows how the aligned averages of rows i and i+2 for the two diagonal directions are computed in only five instructions using two shifting, two shuffling and one averaging MMX intrinsic instruction. Right and left diagonal results are saved in 64-bit register m5 in low and high bytes, respectively.

High Pass Filter Absolute Values and Signs

Once the averages are computed, the high pass filter absolute values and signs for two directions at a time are easily computed by first using the single MMX 'shuffle' instruction shown in FIG. 37 to repeat four middle row (i+1) values in low and high bytes of the 64-bit register m0.

Using a procedure similar to that described hereinabove, absolute values are computed by finding the minimum value of each of the four i,i+2 row averages compared to corresponding middle row pixel and subtracting each of them from the maximum value. FIG. 38 illustrates the effect of MMX 'minimum' (_m_pminub), 'maximum' (_m_pmaxub) and 'subtraction' (_m_psubusb) instructions required to determine high pass filter absolute values. The single 'compare if equal' (_m_pcmpeqb) instruction determines signs for these four bytes (8 bits of '1' for non-positive values if the middle row pixel equals the minimum, 8 bits of '0' otherwise).

FIG. 39 is essentially identical to FIG. 38, except that instead of illustrating processing vertical and horizontal directions, FIG. 39 illustrates processing of left and right diagonals.

Directionality Determination

With four high pass filters directions calculated for each of four middle row pixels, the determination of which directions to include in low pass filtering is done by:
1. Finding the direction with the minimum absolute high pass value and adding an offset ($\Delta$),
2. Identifying direction(s) with absolute high pass values greater than a threshold defined as the minimum plus $\Delta$ and saving a directional map for chroma processing or diagnostic display (as described above),
3. Setting absolute values and signs to zero for direction(s) to exclude from low pass filter.

Figure 40:
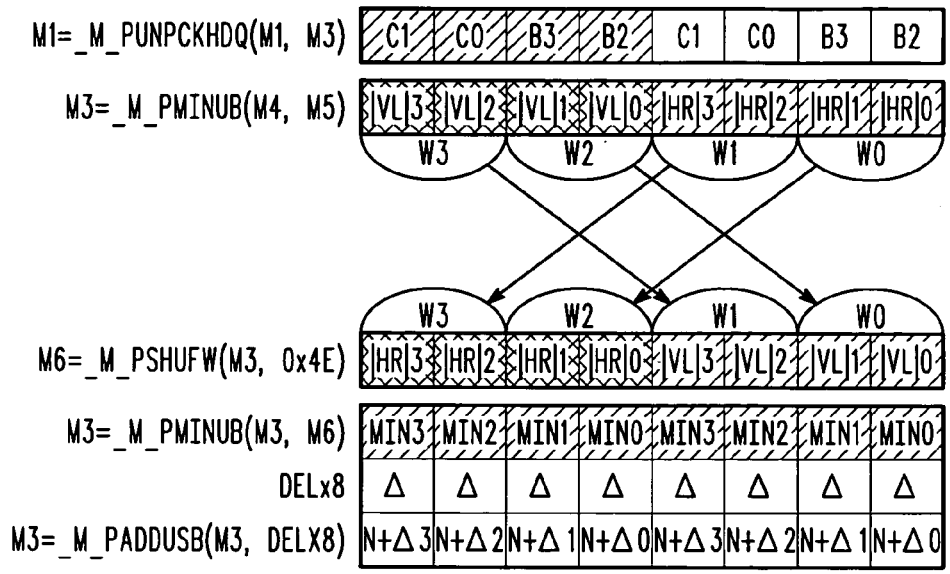
FIG. 40 is a diagram illustrating the effect of MMX instructions implementing determination of minimum absolute value plus offset, according to the invention.

FIG. 40 illustrates Step 1 of this procedure. This step is accomplished in four instructions, which include unpacking i,i+2 row data into a single register and using the other to hold vertical/left diagonal and horizontal/right diagonal minimum values. Exchanging low and high bytes and repeating the 'minimum' MMX intrinsic instruction gives the direction with the lowest absolute value for each of the four bytes. Executed in a single instruction, addition of the non-negative offset parameter ($\Delta$) to each of the eight bytes produces the four threshold values in both low and high bytes of register m3.

Figure 41:
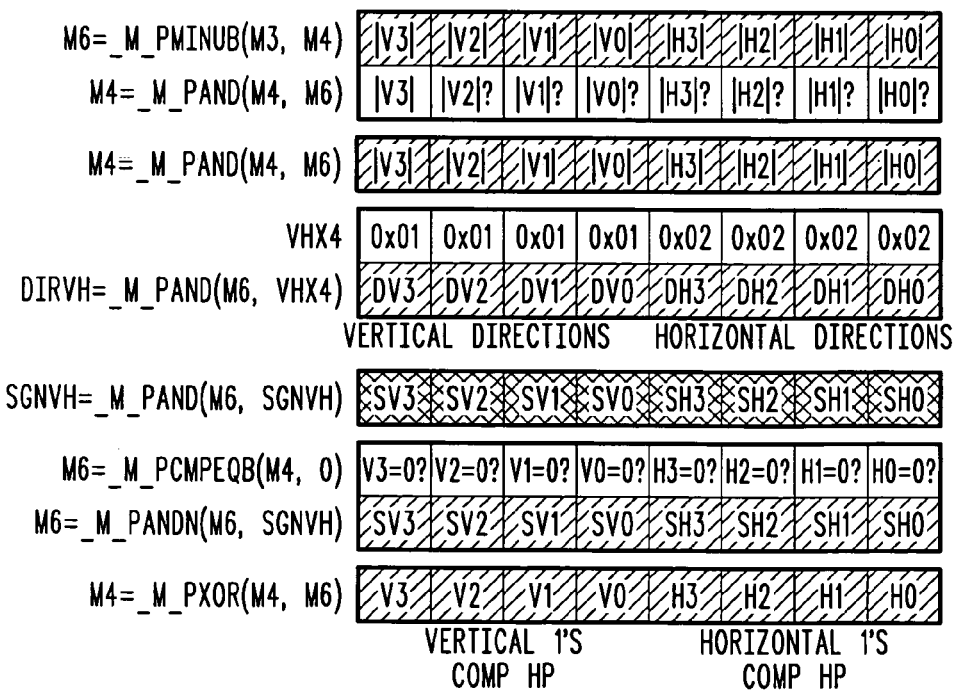
FIG. 41 is a diagram illustrating the effect of MMX instructions implementing determination of directionality and conversion to one's complement, according to the invention.

FIG. 41 illustrates Step 2, which involves identifying high pass filter directions with absolute values greater than the local threshold is performed by 'minimum' and 'compare' instructions.

Step 3 is to zero these values by applying a logical 'and' (_m_pand) as a third instruction in the FIG. 41. For use in chroma smoothing described hereinabove, a "dir-map" specifying whether vertical and horizontal direction(s) are included in low-pass filtering for smoothed luma pixels is saved as a 64-bit quad word, dirvh. The same procedure shown in the figure is also used for left and right diagonals, with the result saved as dirlr. For high-pass filter values equal to zero, sign bytes are also set to zero using three instructions ('and', 'compare', negated 'and') and saving the result in m6 for the vertical and horizontal directions in the figure below and in m7 for left and right diagonals.

In order to convert high-pass results to directional low-pass smoothing filters, unsigned absolute values must be converted to signed values. Using the 'xor' intrinsic instruction shown at the bottom of the above figure performs an exclusive-or of non-negative high-pass absolute values with their appropriate sign bytes to produce eight 1's complement values in m4—four each for vertical and horizontal directions. Like processing for diagonal directions produces four 1's complement values for each with results saved in m5.

Conversion to Low-pass Directional Filters

As explained hereinabove, center-weighting can be varied depending on the number of directions included in the low pass filter by subtracting high-pass results from four times the center pixel value. (Center pixel weighting is 75%, 50%, 25% or 0% one, two, three or four directions, respectively.) FIG. 42 illustrates these calculations, performed in 16-bit word arithmetic for four values at a time.

The top two instructions in the above figure illustrate the unpacking and scaling of the four center pixel values, and the next eight instructions show unpacking of high pass filters with their respective signs and subtraction of four signed values for vertical, horizontal, left diagonal and right diagonal directions.

Since the four high pass filter values subtracted are in 1's complement, conversion to 2's complement requires subtracting the number of negative high pass values for each word in m0. As shown in FIG. 43, these four correction factors in the range [0,4] are computed in six instructions using 'add' (_m_paddb), 'shift' (_m_psllqi) and 'xor' (_m_pxor) MMX intrinsic instructions.

The last two instructions in FIG. 43 (_m_punpckhbw and _m_psubsw) show the effect of unpacking and subtraction of the correction factors from each of four low pass sums shown at the bottom of FIG. 42.

FIG. 44 illustrates calculation of rounded 8 bit values for each "corrected" low pass sum, carried out by the 'add' (_m_paddw) and 'shift' (_m_psrlw) MMX intrinsic instructions, and 64-bit results are packed (_m_packuswb) into a single 32-bit unsigned double and stored into the array of luma pixels in the row above that smoothed.

The final step in processing for four luma pixels is to compute total direction map values by adding those of vertical and horizontal to those of two diagonals. FIG. 45 illustrates the effect of two 'add' (_m_paddb) and one 'shift' (_m_psrlqi) instruction, combining to produce four 8-bit values, stored as a 32-bit result in the unsigned double direction map array.

The 4-byte MMX implementation described above offers a processing speed acceleration of well over 7½ for luma filtering in the the 3×3 neighborhood compared to standard C coding without MMX intrinsics.

Although the invention has been described in connection with various specific embodiments, those skilled in the art will appreciate that numerous adaptations and modifications may be made thereto without departing from the spirit and scope of the invention as set forth in the claims. For example, the algorithms described hereinabove are readily adapted to accommodate any reference image orientation. Although generally shown and described herein with respect to image pixels whose numbering increases left to right and top to bottom, the techniques described hereinabove are readily adapted to different pixel numbering schemes. The horizontal and vertical sense of the image can be swapped, or the left/right or top/bottom sense of the image can be reversed (either in actual presentation of the image or in terms of pixel numbering). These minor alterations are essentially equivalent in terms of the inventive technique and are readily accommodated by making appropriate minor adaptations to the technique

What is claimed is:

1. A method of reducing spatial noise in an image having a plurality of pixels, the pixels being arranged in a plurality of (h) rows and (w) columns, comprising:
providing a set of three 64 bit registers, each register representing eight horizontally adjacent pixel values from one of three respective vertically adjacent image rows;
computing eight sets of directional high-pass values, one for each horizontal pixel position represented by said registers; and
computing directionally smoothed low pass pixel values by combining said high-pass values with image pixel values to produce directionally weighted sums; and
using the weighted sums to provide a reduced spatial noise image.

2. A method according to claim 1, wherein:
said three 64-bit registers include a first (up) register, a second (mid) register and a third (down) register, said first, second and third registers each representing pixel values for eight horizontally adjacent image pixels;
pixel values in said first (up) register represent image pixels horizontally aligned with and vertically adjacent to pixels represented by corresponding pixel values in said second (mid) register; and
pixel values in said second (mid) register represent image pixels horizontally aligned with and vertically adjacent to pixels represented by corresponding pixel values in said third (down) register.

3. A method according to claim 2, wherein:
said step of computing eight sets of directional high-pass values further comprises:
computing eight average values for corresponding first and third image row pixels in said first (up) and third (down) registers;
computing eight maxima and eight minima between said average values and corresponding second image row pixels in said second (mid) register;
determining eight high-pass absolute values by subtracting said minima from said maxima;
setting values of eight sign bytes such that if corresponding second row pixel values and minima are equal, a corresponding sign byte is set to all 1's, otherwise the corresponding sign byte is set to all 0's;
shifting the first (up) and third (down) registers for left diagonal alignment of pixel values;
calculating left diagonal high-pass absolute values and signs;
shifting the first (up) and third (down) registers for right diagonal alignment of pixel values;
calculating right diagonal high-pass absolute values and signs;
shifting said second (mid) register for horizontal alignment of pixel values; and
calculating horizontal high-pass absolute values and signs.

4. A method according to claim 2, wherein:
said step of computing directionally smoothed low pass pixel values further comprises:
clearing (zeroing) high-pass values to exclude from low pass filters;
clearing (zeroing) sign bytes for high pass values equal to zero;
computing low pass values for four upper bytes by summing four corresponding high-pass values and subtracting from four corresponding second image row pixel values in said second (mid) register; and
computing low pass values for four lower bytes by summing four corresponding high-pass values and subtracting from four corresponding second image row pixel values in said second (mid) register.

5. A method according to claim 2, wherein:
the first (up) register represents pixels p(i−1, j+k) in a corresponding first (up) image row;
the second (mid) register represents pixels p(i, j+k) in a corresponding second (mid) image row; and
the third (down) register represents pixels p(i+1, j+k) in a corresponding third (down) image row.

6. A method according to claim 5, further comprising:
storing directional smoothing results for pixels p(i, j+k) in place of p(i−1, j+k).

7. A method according to claim 5, further comprising:
computing scaled high-pass filters (hp_(i,j+,k,d)) for an aligned vertical direction (d=1) for eight horizontally contiguous pixels simultaneously using the relationship:

$$hp\_filt(i,j+,k,d)=p(i,j+k)-(p(i-1,j+k)+p(i+1,j+k))/2$$
$$k=[0,7].$$

8. A method, according to claim 5, further comprising:
calculating low-pass filter values (lp_MMX(i,j+k) ) in accordance with the relationship:

$$lp\_MMX(i, j+k) = \left[4 \cdot p(i, j+k) - \sum_{d-1}^{D} hp\_filt(i, j+k, d)\right] \gg 2$$

$k = [0, 7]$.

9. A method according to claim 5, further comprising:
determining a degree of directional smoothing for each pixel according to a number of directional high-pass values (hp_filt(i,j+k,d) ) that have high-pass absolute values less than or equal to $|hp_{min}(i,j+k)+\Delta|$.

10. A method of reducing spatial noise in an image having a plurality of pixels, the pixels being arranged in a plurality of (h) rows and (w) columns, comprising:
providing a set of 64 bit registers for representing eight 8-bit pixel values, said registers including a first (up) register for representing eight horizontally adjacent pixel values from a first image row; a second (mid) register for representing eight horizontally adjacent pixel values from a second image row, said second image row pixels occurring vertically adjacent to and horizontally aligned with said first row pixels; and a third (down) register for representing eight horizontally adjacent pixel values from a third image row, said third image row pixels occurring vertically adjacent to and horizontally aligned with said second image row pixels;
loading said first (up), second (mid) and third (down) registers with pixel values from three vertically adjacent image row and saving previous register contents;
computing eight average values for corresponding first and third image row pixels in said first (up) and third (down) registers;
computing eight maxima and eight minima between said average values and corresponding second image row pixels in said second (mid) register;
determining eight high-pass absolute values by subtracting said minima from said maxima;
setting values of eight sign bytes such that if corresponding second row pixel values and minima are equal, a corresponding sign byte is set to all 1's, otherwise the corresponding sign byte is set to all 0's;
shifting the first (up) and third (down) registers for left diagonal alignment of pixel values;
calculating left diagonal high-pass absolute values and signs;
shifting the first (up) and third (down) registers for right diagonal alignment of pixel values;
calculating right diagonal high-pass absolute values and signs;
shifting said second (mid) register for horizontal alignment of pixel values;
calculating horizontal high-pass absolute values and signs;
clearing (zeroing) high-pass values to exclude from low pass filters;

clearing (zeroing) sign bytes for high pass values equal to zero;
computing low pass values for four upper bytes by summing four corresponding high-pass values and subtracting from four corresponding second image row pixel values in said second (mid) register;
computing low pass values for four lower bytes by summing four corresponding high-pass values and subtracting from four corresponding second image row pixel values in said second (mid) register; and
packing and storing said low pass values into said first register.

11. A method of reducing spatial noise in an image having a plurality of pixels, the pixels being arranged in a plurality of (h) rows and (w) columns, comprising:
calculating a plurality of high-pass filter values for a number of pixels based upon surrounding pixel values in a 5×5 pixel area surrounding each pixel for which a high-pass filter value is to be calculated;
determining directionality information for each from the high-pass filter values for each pixel;
determining directional low-pass (smoothing) filter values for each pixel based upon the directionality information for each pixel;
applying the low-pass filter values (smoothing) to each pixel according to pixel values in the 5×5 pixel area surrounding each pixel; and
displaying the spatially reduced noise image.

12. A method according to claim 11, wherein each high-pass filter calculation comprises a summation of products, each product being determined by multiplying each pixel value in a 5×5 pixel area surrounding each pixel by a corresponding high-pass filter coefficients.

13. A method according to claim 12, wherein directionality is determined by identifying a high-pass filter value with a highest absolute value above a threshold value.

14. A method according to claim 13, wherein the threshold value is determined by adding a constant to the value of the high-pass filter having a minimum absolute value.

15. A method according to claim 11, wherein the directional low pass filter values are determined to decrease the relative amount of smoothing applied in a direction indicated by the directionality information.

16. A method according to claim 11, wherein the number of low pass (smoothing) filters for each pixel value is equal to the number of corresponding high pass filters.

17. A method according to claim 16, wherein the number of high pass filters for each pixel value is four.

18. A method according to claim 17, wherein the filter directions are horizontal, vertical, diagonal right and diagonal left.

19. A method according to claim 16, wherein the number of high pass filters for each pixel value is eight.

20. A method according to claim 19, wherein the filter directions are, horizontal, vertical, diagonal right, diagonal left, greater diagonal right, greater diagonal left, lesser diagonal right and lesser diagonal left.

* * * * *